United States Patent
Kim et al.

(10) Patent No.: US 12,408,210 B2
(45) Date of Patent: Sep. 2, 2025

(54) METHOD AND DEVICE FOR SCANNING FOR AND CONNECTING BLUETOOTH DEVICE

(71) Applicant: LG ELECTRONICS INC., Seoul (KR)

(72) Inventors: Jeonghwan Kim, Seoul (KR); Hongwon Lee, Seoul (KR); Jingu Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 322 days.

(21) Appl. No.: 18/017,029

(22) PCT Filed: Jul. 20, 2020

(86) PCT No.: PCT/KR2020/009526
§ 371 (c)(1),
(2) Date: Jan. 19, 2023

(87) PCT Pub. No.: WO2022/019345
PCT Pub. Date: Jan. 27, 2022

(65) Prior Publication Data
US 2023/0292379 A1    Sep. 14, 2023

(51) Int. Cl.
*H04W 8/00* (2009.01)
*H04W 76/10* (2018.01)

(52) U.S. Cl.
CPC ........... *H04W 76/10* (2018.02); *H04W 8/005* (2013.01)

(58) Field of Classification Search
CPC ....... H04W 4/80; H04W 8/005; H04W 76/10; H04W 48/14; H04W 36/035; H04W 36/00; H04W 36/142; H04W 36/0011; H04W 8/00
See application file for complete search history.

(56) References Cited

U.S. PATENT DOCUMENTS

| | | | |
|---|---|---|---|
| 10,548,068 B2* | 1/2020 | Lee | H04W 36/035 |
| 2015/0373761 A1 | 12/2015 | Okamoto | |
| 2017/0280277 A1 | 9/2017 | Ge et al. | |
| 2018/0317071 A1* | 11/2018 | Rabii | H04W 12/50 |
| 2019/0229802 A1 | 7/2019 | Panther et al. | |

FOREIGN PATENT DOCUMENTS

KR    20170038825    4/2017

OTHER PUBLICATIONS

PCT International Application No. PCT/KR2020/009526, International Search Report dated Apr. 8, 2021, 9 pages.

* cited by examiner

*Primary Examiner* — Tuan H Nguyen
(74) *Attorney, Agent, or Firm* — LEE, HONG, DEGERMAN, KANG & WAIMEY

(57) ABSTRACT

In a wireless communication system supporting Bluetooth communication, an in-flight entertainment (IFE) device may perform scanning for a first Bluetooth low energy (BLE) device and a first Bluetooth basic rate/enhanced data rate (BR/EDR) device. The scanning for the first BLE device and the first Bluetooth BR/EDR device may be performed in a time division (TD) manner performed in different time intervals. The scanning for the first BLE device may include a step of receiving a first advertising signal of the first BLE device. The scanning for the first Bluetooth BR/EDR device may include a step of transmitting a scan signal and receiving a first scan response signal from the first Bluetooth BR/EDR device, by the IFE device.

4 Claims, 16 Drawing Sheets

METHOD AND DEVICE FOR SCANNING FOR AND CONNECTING BLUETOOTH DEVICE

CROSS-REFERENCE TO RELATED APPLICATIONS

This application is the National Stage filing under 35 U.S.C. 371 of International Application No. PCT/KR2020/009526, filed on Jul. 20, 2020, the contents of which are all incorporated by reference herein in their entirety.

TECHNICAL FIELD

The present specification relates to a method connecting an In Flight Entertainment (IFE) device to a Portable Electronic Device (PED) supporting Bluetooth communication in a wireless communication system supporting Bluetooth communication.

BACKGROUND

Bluetooth is one of the representative short-range wireless technologies for exchanging information by connecting various devices (smartphones, PCs, earphones, headphones, etc.) to each other. In addition, many people use it easily as a technology applied to most smartphones, PCs, laptops, etc., and the easy pairing procedure provides stable connectivity between devices. Recently developed LE technology can stably provide hundreds of kilobytes of information while consuming little power.

Bluetooth standard technology is divided into BR/EDR (Basic Rate/Enhanced Data Rate) and LE (Low Energy) core specifications.

Among them, Bluetooth Low Energy (hereinafter referred to as 'BLE') is a technology announced after Bluetooth Specification V4.

Since the BLE technology is designed to perform a connection procedure only when a data transmission request occurs between a master device and a slave device, it may not be suitable for real-time audio stream transmission where data transmission requests occur periodically.

That is, the BLE Master performs Connection in a short time when the Slave requests data transmission and reception, and performs Disconnection after exchanging necessary data within a relatively short time.

SUMMARY

A method performed by an In Flight Entertainment (IFE) device in a wireless communication system supporting Bluetooth communication according to various embodiments may include technical features related to a method of connecting to a portable electronic device (PED). An In Flight Entertainment (IFE) device may perform a scan for a first Bluetooth low energy (BLE) device and a first Bluetooth basic rate/enhanced data rate (BR/EDR) device. The search for the first BLE device and the first Bluetooth BR/EDR device may be performed in a time division (TD) method performed in different time intervals. The search for the first BLE device may include receiving a first advertising signal of the first BLE device. The search for the first Bluetooth BR/EDR device may include transmitting a search signal by the IFE device and receiving a first search response signal from the first Bluetooth BR/EDR device.

According to an example of the present specification, it is possible to easily connect a portable electronic device (PED) and an in-flight entertainment (IFE) device in a situation where space is narrow and various devices are mixed, such as in an airplane. When a user tries to connect with a BR/EDR device in a space such as an airplane, all Inquiry Scan devices in the scan range are listed, but it is inconvenient for the user to check only with the Alias Name or BD ADDR of the device to be connected. According to an example of the present specification, since the IFE devices are arranged and exposed in the order of nearby devices, the user can easily select his/her Bluetooth device.

When a user tries to connect with a BLE device in a space such as an airplane, a notification is displayed on all devices around it through BLE Advertising. Therefore, in a narrow environment where many devices are mixed, notifications cause inconvenience to other users. According to an example of the present specification, only advertising signals of nearby BLE devices can be searched through whitelist and RSSI threshold settings. Therefore, there is an effect of reducing inconvenience to nearby users.

DETAILED DESCRIPTION

In the present specification, "A or B" may mean "only A", "only B" or "both A and B". In other words, in the present specification, "A or B" may be interpreted as "A and/or B". For example, in the present specification, "A, B, or C" may mean "only A", "only B", "only C", or "any combination of A, B, C".

A slash (/) or comma used in the present specification may mean "and/or". For example, "A/B" may mean "A and/or B". Accordingly, "A/B" may mean "only A", "only B", or "both A and B". For example, "A, B, C" may mean "A, B, or C".

In the present specification, "at least one of A and B" may mean "only A", "only B", or "both A and B". In addition, in the present specification, the expression "at least one of A or B" or "at least one of A and/or B" may be interpreted as "at least one of A and B".

In addition, in the present specification, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present specification may mean "for example". Specifically, when indicated as "control information (control signal)", it may denote that "control signal" is proposed as an example of the "control information". In other words, the "control information" of the present specification is not limited to "control signal", and "control signal" may be proposed as an example of the "control information". In addition, when indicated as "control information (i.e., control signal)", it may also mean that "control signal" is proposed as an example of the "control information".

Technical features described individually in one figure in the present specification may be individually implemented, or may be simultaneously implemented.

The following example of the present specification may be applied to various wireless communication systems. For example, the following example of the present specification may be applied to a Bluetooth communication system.

Hereinafter, in order to describe a technical feature of the present specification, a technical feature applicable to the present specification will be described.

Figure 1:
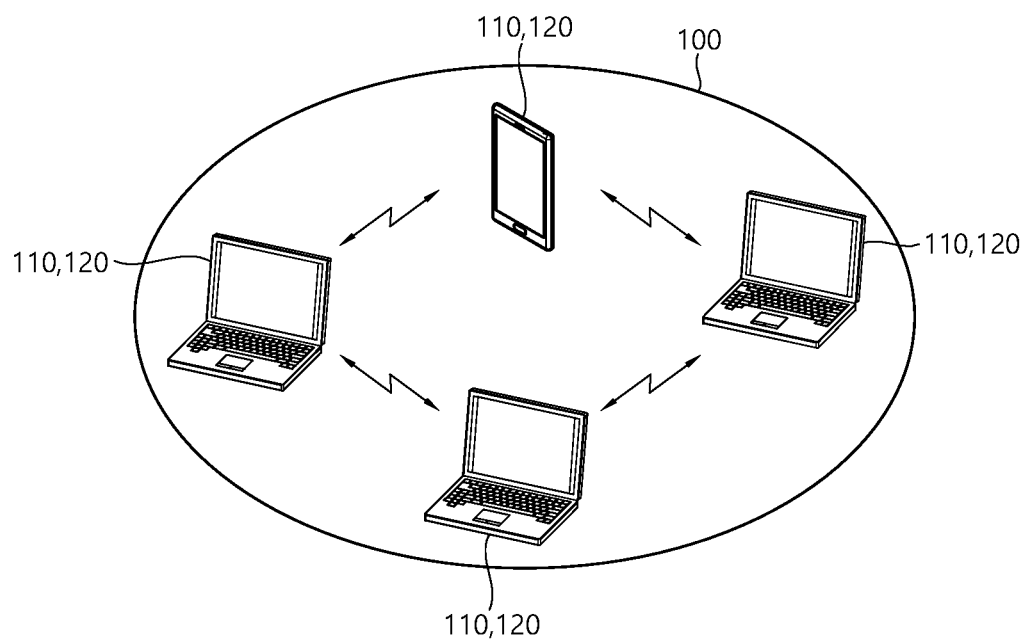
FIG. 1 is a schematic diagram showing an example of a wireless communication system using Bluetooth low energy technology proposed in this specification.

FIG. 1 is a schematic diagram showing an example of a wireless communication system using Bluetooth low energy technology proposed in this specification.

The wireless communication system 100 includes at least one server device (Server Device, 110) and at least one client device (Client Device, 120).

The server device and the client device perform Bluetooth communication using Bluetooth Low Energy (BLE, hereinafter referred to as 'BLE' for convenience) technology.

First, compared to Bluetooth BR/EDR (Basic Rate/Enhanced Data Rate) technology, BLE technology has a relatively small duty cycle, enables low-cost production, and can significantly reduce power consumption through low-speed data transmission rates. If a coin cell battery is used, it can operate for more than one year.

In addition, the BLE technology simplifies the connection procedure between devices, and the packet size is designed to be smaller than that of Bluetooth BR/EDR technology.

In BLE technology, (1) the number of RF channels is 40, (2) the data transmission rate supports 1 Mbps, (3) the topology is a star structure, (4) the latency is 3 ms, and (5) the maximum current is It is less than 15 mA, (6) output power is less than 10 mW (10 dBm), and (7) is mainly used for applications such as mobile phones, watches, sports, health care, sensors, and device control.

The server device 110 may operate as a client device in relation to other devices, and the client device may operate as a server device in relation to other devices. That is, in the BLE communication system, any one device can operate as a server device or a client device, and, if necessary, it is also possible to simultaneously operate as a server device and a client device.

The server device 110 can be expressed as a data service device, a master device, a master, a server, a conductor, a host device, an audio source device, a first device, etc. The client device may be expressed as a slave device, a slave, a client, a member, a sink device, an audio sink device, a second device, and the like.

The server device and the client device correspond to the main components of the wireless communication system, and the wireless communication system may include other components in addition to the server device and the client device.

The server device refers to a device that receives data from a client and directly communicates with the client device to provide data to the client device through a response when receiving a data request from the client device.

In addition, the server device sends a notification message and an indication message to the client device to provide data information to the client device. In addition, when transmitting the instruction message to the client device, the server device receives a confirmation message corresponding to the instruction message from the client.

In addition, the server device can provide data information to the user through a display unit or receive a request input from the user through a user input interface in the process of transmitting and receiving notification, instruction, and confirmation messages with the client device.

In addition, the server device may read data from a memory unit or write new data to a corresponding memory unit in the course of transmitting and receiving a message with the client device.

In addition, one server device can be connected to a plurality of client devices, and can be easily reconnected (or connected) with client devices by utilizing bonding information.

The client device 120 refers to a device that requests data information and data transmission from a server device.

The client device receives data from the server device through a notification message, an instruction message, and the like, and when receiving the instruction message from the server device, sends a confirmation message in response to the instruction message.

Similarly, the client device may provide information to a user through an output unit or receive input from a user through an input unit in the process of transmitting and receiving messages with the server device.

In addition, the client device may read data from a memory or write new data to a corresponding memory while transmitting and receiving a message with the server device.

Hardware components such as an output unit, an input unit, and a memory of the server device and the client device will be described in detail with reference to FIG. 2.

In addition, the wireless communication system may configure Personal Area Networking (PAN) through Bluetooth technology. For example, in the wireless communication system, files and documents can be exchanged quickly and safely by establishing a private piconet between devices.

A BLE device (or appliance) may be operable to support various Bluetooth-related protocols, profiles, processes, and the like.

Figure 2:
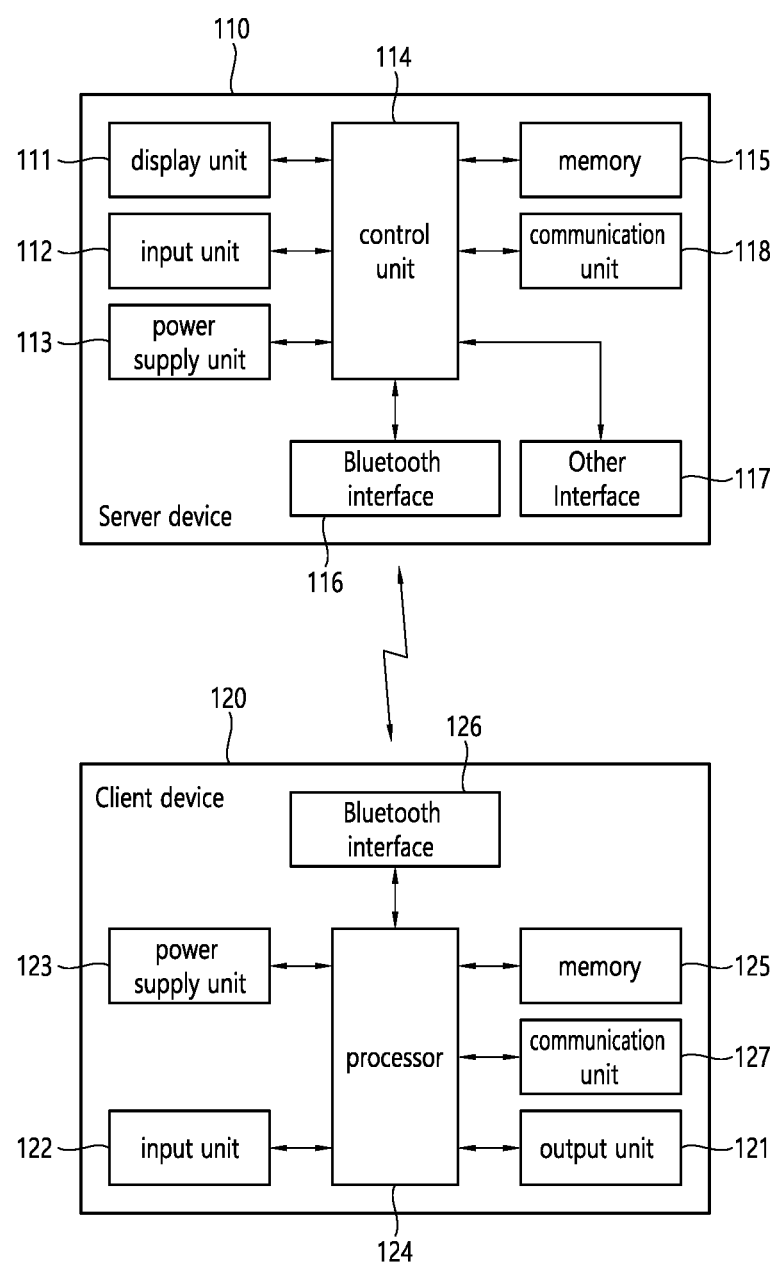
FIG. 2 shows an example of an internal block diagram of a server device and a client device capable of implementing the methods proposed in this specification.

FIG. 2 shows an example of an internal block diagram of a server device and a client device capable of implementing the methods proposed in this specification.

A server device may be connected with at least one client device.

In addition, if necessary, the block diagram of each device may further include other components (modules, blocks, units), and some of the components shown in FIG. 2 may be omitted.

As shown in FIG. 2, the server device includes a display unit 111, an input unit 112, a power supply unit 113, a processor 114, and a memory unit 115, a Bluetooth interface 116, another Interface 117, and a communication unit (or transceiver, 118).

The output unit 111, the input unit 112, the power supply unit 113, the processor 114, the memory 115, the Bluetooth interface 116, the other communication interface 117 and the communication unit 118 are functionally connected to perform the method proposed in this specification.

In addition, the client device includes an output unit (Display Unit, 121), an input unit (User Input Interface, 122), a power supply unit, 123, a processor, 124, a memory (Memory Unit, 125), and a Bluetooth interface, 126 and a communication unit (or transceiver, 127).

The output unit 121, the input unit 122, the power supply unit 123, the processor 124, the memory 125, the Bluetooth interface 126, and the communication unit 127 are functionally connected to perform the method proposed in this specification.

The Bluetooth interfaces 116 and 126 refer to units (or modules) capable of transmitting requests/responses, commands, notifications, instruction/confirmation messages, etc., or data between devices using Bluetooth technology.

The memories 115 and 125 are units implemented in various types of devices and refer to units in which various types of data are stored.

The processors 114 and 124 refer to modules that control the overall operation of a server device or a client device, and control to request transmission of messages through a Bluetooth interface and other communication interfaces, and to process received messages.

The processors 114 and 124 may be expressed as a controller, a control unit, or a controller.

The processors 114 and 124 may include application-specific integrated circuits (ASICs), other chipsets, logic circuits, and/or data processing devices.

The memories 115 and 125 may include read-only memory (ROM), random access memory (RAM), flash memory, memory cards, storage media, and/or other storage devices.

The communication units 118 and 127 may include baseband circuits for processing radio signals. When the embodiment is implemented as software, the above-described technique may be implemented as a module (process, function, etc.) that performs the above-described functions. A module can be stored in memory and executed by a processor.

The memories 115 and 125 may be internal or external to the processors 114 and 124 and may be connected to the processors 114 and 124 by various well-known means.

The output units 111 and 121 refer to modules for providing device status information and message exchange information to the user through a screen.

The power supply unit (power supply units 113 and 123) refers to a module that receives external power and internal power under the control of a control unit and supplies power required for operation of each component.

As seen above, BLE technology has a small duty cycle and can greatly reduce power consumption through low data rates. The power supply unit can supply power necessary for the operation of each component even with a small output power (less than 10 mW (10 dBm)).

The input units 112 and 122 refer to modules that allow the user to control the operation of the device by providing a user's input to the control unit, such as a screen button.

Figure 3:
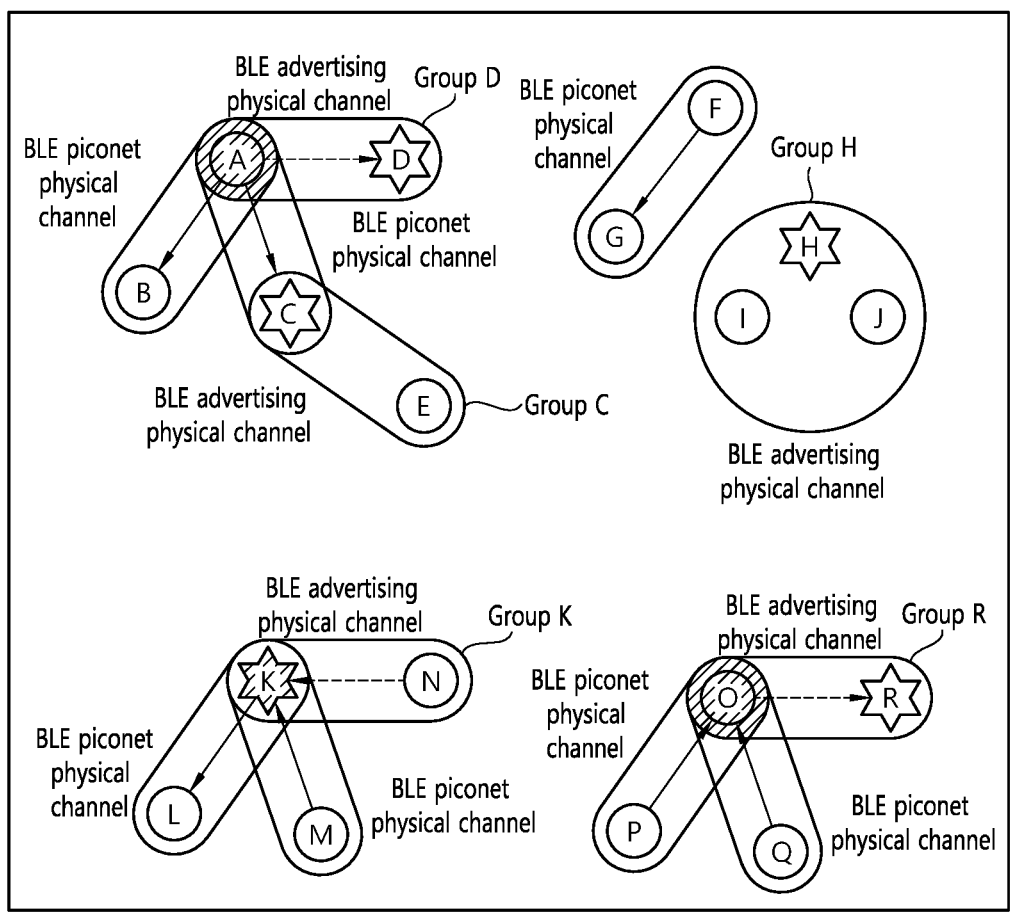
FIG. 3 shows an example of a Bluetooth low energy topology.

FIG. 3 shows an example of a Bluetooth low energy topology.

Referring to FIG. 3, device A corresponds to a master in a piconet (piconet A, shaded area) having device B and device C as slaves.

Here, a piconet refers to a set of devices occupying a shared physical channel in which one of a plurality of devices is a master and the other devices are connected to the master device.

A BLE slave does not share a common physical channel with the master. Each slave communicates with the master through a separate physical channel. There is another piconet (piconet F) with a master device F and a slave device G.

Device K is on scatternet K. Here, a scatternet refers to a group of piconets in which connections between other piconets exist.

Device K is the master of device L and the slave of device M.

Device O is also on scatternet O. Device O is both a slave of device P and a slave of device Q.

As shown in FIG. 3, there are five different device groups.

Device D is the advertiser and device A is the initiator. (Group D)

Device E is a scanner, and device C is an advertiser (group C).

Device H is an advertiser and devices I and J are scanners. (Group H)

Device K is also an advertiser, and device N is an initiator. (Group K)

Device R is the advertiser and device O is the initiator. (Group R)

Devices A and B use one BLE piconet physical channel.

Devices A and C use another BLE piconet physical channel.

In group D, device D advertises using an advertising event connectable on an advertising physical channel, and device A is the initiator. Device A can form a connection with device D and add the device to piconet A.

In group C, device C advertises on the advertising physical channel using some type of advertising event captured by scanner device E.

Group D and group C may use different advertising physical channels or use different times to avoid collisions.

Piconet F has one physical channel. Devices F and G use one BLE piconet physical channel. Device F is the master and device G is the slave.

Group H has one physical channel. Devices H, I and J use one BLE advertising physical channel. Device H is an advertiser and devices I and J are scanners.

In scatternet K, devices K and L use one BLE piconet physical channel. Devices K and M use another BLE piconet physical channel.

In group K, device K advertises using an advertising event connectable on the advertising physical channel, and device N is the initiator. Device N can form a connection with device K. Here, device K becomes a slave of two devices and a master of one device at the same time.

In Scatternet O, devices O and P use one BLE piconet physical channel. Devices O and Q use another BLE piconet physical channel.

In group R, device R advertises using an advertising event connectable on the advertising physical channel, and device O is the initiator. Device O can form a connection with device R. Here, device O becomes a slave of two devices and a master of one device at the same time.

Figure 4:
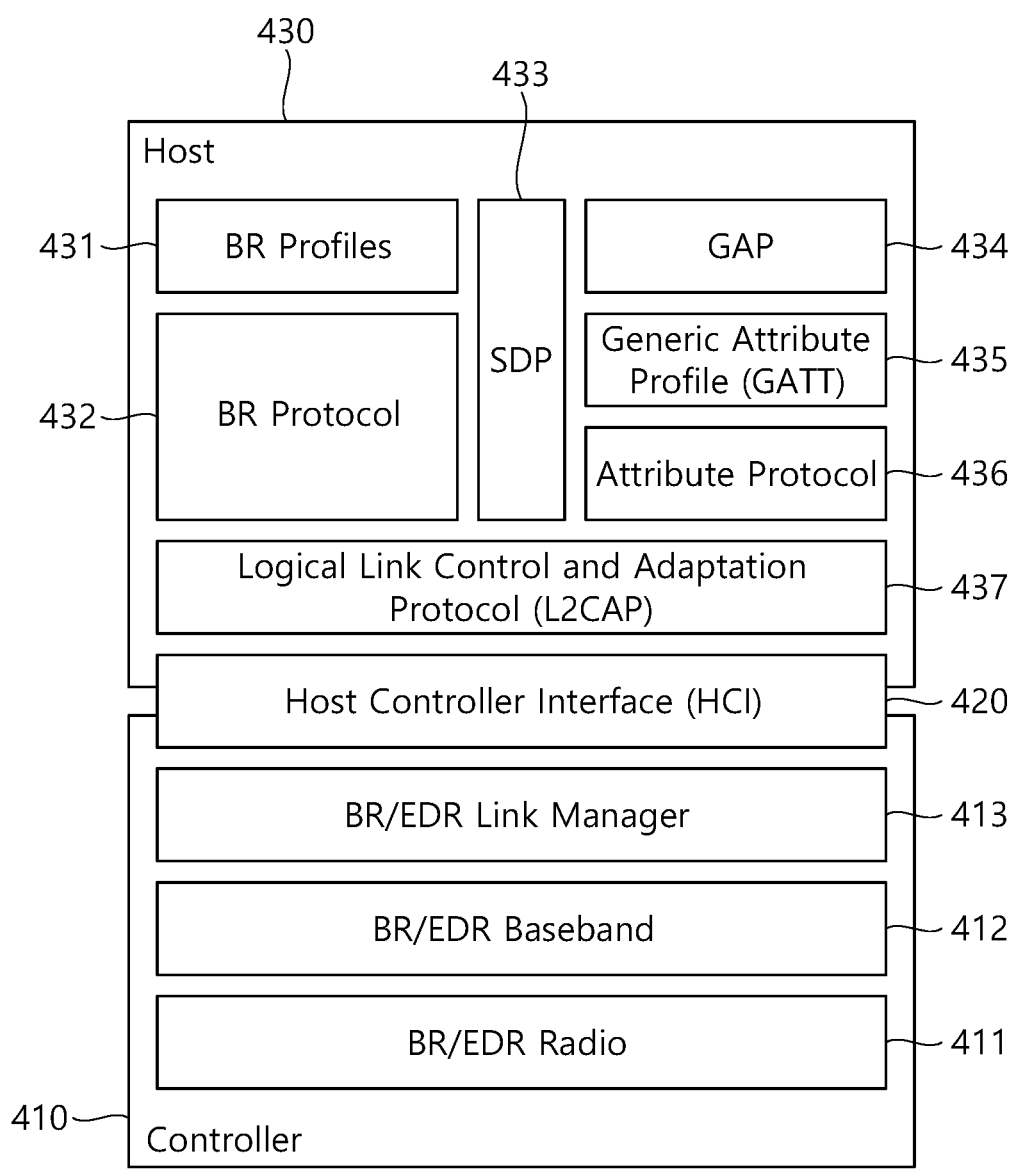
FIGS. 4 and 5 are diagrams illustrating an example of a Bluetooth communication architecture to which the methods proposed in this specification can be applied.
Figure 5:
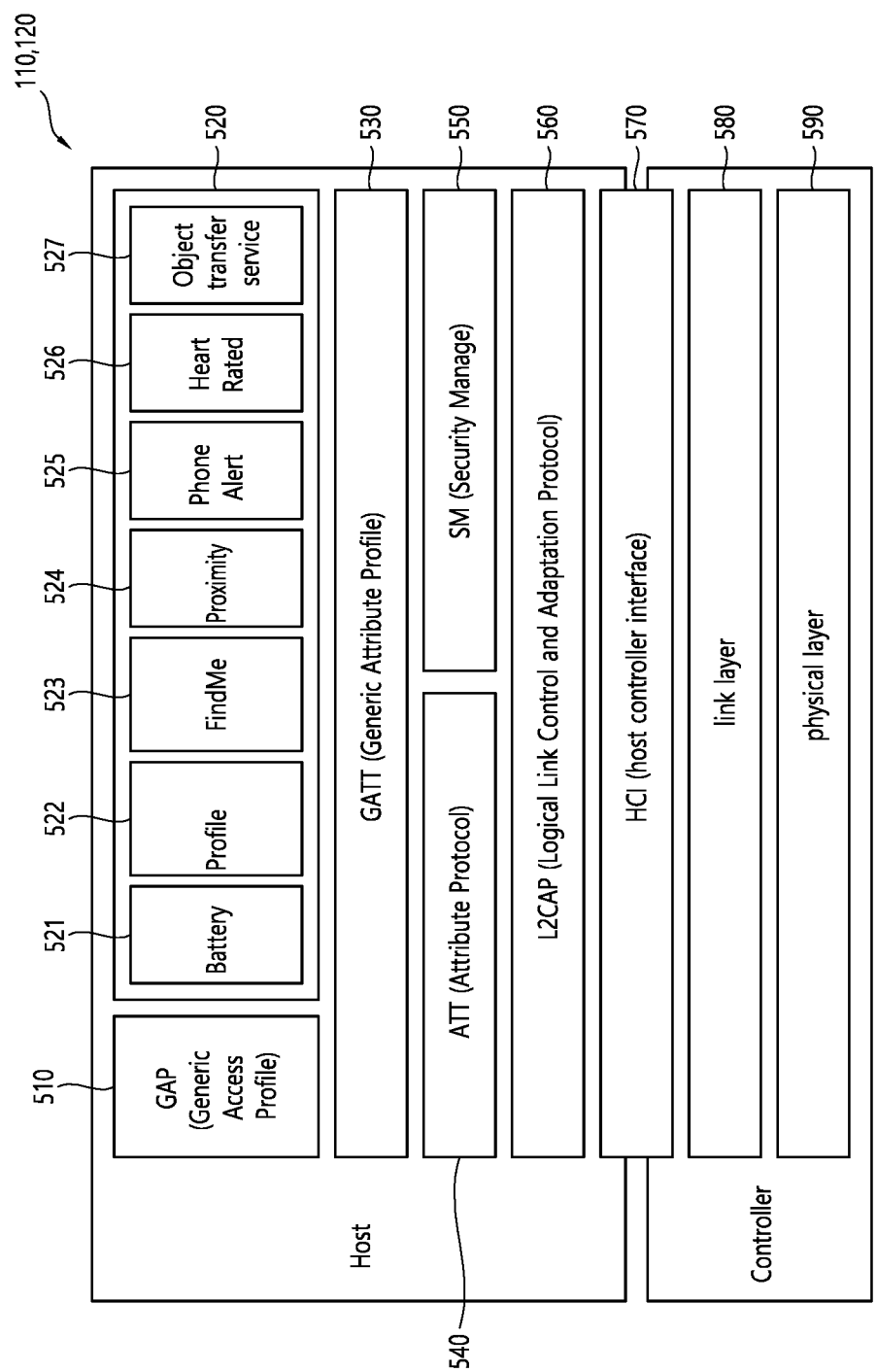

FIGS. 4 and 5 are diagrams illustrating an example of a Bluetooth communication architecture to which the methods proposed in this specification can be applied.

Specifically, FIG. 4 illustrates an example of a Bluetooth Basic Rate (BR)/Enhanced Data Rate (EDR) architecture, and FIG. 5 illustrates an example of a Bluetooth Low Energy (LE) architecture.

First, as shown in FIG. 4, the Bluetooth BR/EDR architecture includes a controller stack (Controller stACK) 410, a Host Controller Interface (HCI) 420, and a host stack (Host stACK) 430.

The controller stack (or controller module 410) refers to a wireless transmission/reception module that receives a 2.4 GHz Bluetooth signal and hardware for transmitting or receiving Bluetooth packets, and includes a BR/EDR Radio layer 411 and a BR/EDR baseband layer 412), and a BR/EDR Link Manager layer 413.

The BR/EDR Radio layer 411 is a layer that transmits and receives 2.4 GHz radio signals, and can transmit data by hopping 79 RF channels when Gaussian Frequency Shift Keying (GFSK) modulation is used.

The BR/EDR=Baseband layer 412 is responsible for transmitting a digital signal, selects a channel sequence hopping 1600 times per second, and transmits a time slot with a length of 625 us for each channel.

The Link Manager layer 413 utilizes Link Manager Protocol (LMP) to control overall operations (link setup, control, and security) of a Bluetooth connection.

The Link Manager layer may perform the following functions.

ACL/SCO logical transport and logical link setup and control.

Detach: Aborts the connection and notifies the other device of the reason for the abort.

Power control and role switch.

Performs security (authentication, pairing, encryption) functions.

The Host Controller Interface layer 420 provides an interface between the host module 430 and the controller module 410 so that the host can provide commands and data to the controller, and the controller can provide events and data to the host.

The host stack (or host module 430) includes L2CAP (437), SDP (Service Discovery Protocol, 433), BR/EDR Protocol (432), BR/EDR Profiles (431), Attribute Protocol (436), Generic Access Profile (GAP,434) and Generic Attribute Profile (GATT,435).

The Logical Link Control and Adaptation Protocol (L2CAP, 437) provides one bidirectional channel for transmitting data to a specific protocol or profile.

The L2CAP multiplexes various protocols and profiles provided by Bluetooth.

L2CAP of Bluetooth BR/EDR uses dynamic channel, supports protocol service multiplexer, retransmission, and streaming mode, and provides segmentation and reassembly, per-channel flow control, and error control.

The Service Discovery Protocol (SDP) 433 refers to a protocol for finding services (profiles and protocols) supported by a Bluetooth device.

The BR/EDR Protocol and Profiles 432 and 431 define a service (profile) using Bluetooth BR/EDR and an application protocol for exchanging these data.

The Attribute Protocol 436 is a Server-Client structure and defines rules for accessing data of a counterpart device. There are 6 message types (Request message, Response message, Command message, Notification message, Indication message) as shown below.

Request message from client to server with Response message from server to client Command message from client to server without Response message Notification message from server to client without Confirm message Indication message from server to client with Confirm message from client to server The Generic Attribute Profile (GATT, 435) defines the type of attribute.

The Generic Access Profile (GAP, 434) defines device discovery, connection, and methods of providing information to users, and provides privacy.

As shown in FIG. 5, the BLE architecture includes a controller stack (Controller stACK) operable to process a radio interface where timing is critical and a host stack (Host stACK) operable to process high level data.

The controller stACK may be called a controller, but in order to avoid confusion with the processor, which is an internal component of the device previously mentioned in FIG. 2, it will be expressed as a controller stACK below.

First, the controller stack may be implemented using a communication module that may include a Bluetooth radio and a processor module that may include a processing device such as, for example, a microprocessor.

The host stack may be implemented as part of the OS running on the processor module or as an instantiation of a package (pACKage) on the OS.

In some instances, a controller stack and a host stack may operate or run on the same processing device within a processor module.

The host stack includes GAP (Generic Access Profile, 510), GATT based Profiles (520), GATT (Generic Attribute Profile, 530), ATT (Attribute Protocol, 540), SM (Security Manage, 550), L2CAP (Logical Link Control and Adaptation Protocol, 560). However, the host stack is not limited thereto and may include various protocols and profiles.

The host stack uses L2CAP to multiplex various protocols and profiles provided by Bluetooth.

First, L2CAP (Logical Link Control and Adaptation Protocol, 560) provides one bidirectional channel for transmitting data to a specific protocol or profile.

L2CAP may be operable to multiplex data between higher layer protocols, segment and reassemble packages, and manage multicast data transmission.

BLE uses three fixed channels (one for signaling CH, one for Security Manager, and one for Attribute protocol).

On the other hand, BR/EDR (Basic Rate/Enhanced Data Rate) uses a dynamic channel and supports protocol service multiplexer, retransmission, streaming mode, and the like.

Security Manager (SM) 550 is a protocol for authenticating devices and providing key distribution.

ATT (Attribute Protocol, 540) defines rules for accessing data of a counterpart device in a server-client structure. There are 6 message types (Request, Response, Command, Notification, Indication, Confirmation) in ATT.

That is, ① Request and Response message: The Request message is a message for requesting specific information from the client device to the server device, and the Response message is a response message to the Request message and refers to a message transmitted from the server device to the client device.

② Command message: This is a message transmitted from the client device to the server device to instruct a specific operation command. The server device does not transmit a response to the command message to the client device.

③ Notification message: This is a message sent from the server device to the client device to notify such as an event. The client device does not transmit a confirmation message for the notification message to the server device.

④ Indication and Confirm message: This is a message sent from the server device to the client device to notify such as an event. Unlike the notification message, the client device transmits a confirmation message for the indication message to the server device.

GAP (Generic Access Profile) is a newly implemented layer for BLE technology, and is used to control role selection and multi-profile operation for communication between BLE devices.

In addition, GAP is mainly used for device discovery, connection creation, and security procedures, defines a method of providing information to users, and defines the following attribute types.

① Service: Defines the basic operation of the device as a combination of behaviors related to data
② Include: Defines the relationship between services
③ Characteristics: Data values used in the service
④ Behavior: Computer-readable format defined as UUID (Universal Unique Identifier, value type)

GATT-based Profiles are profiles that depend on GATT and are mainly applied to BLE devices. GATT-based Profiles may be Battery, Time, FindMe, Proximity, Time, Object Delivery Service, etc. Details of GATT-based Profiles are as follows.

Battery: How to exchange battery information
Time: How to exchange time information
FindMe: Provides alarm service according to distance
Proximity: how to exchange battery information
Time: How to exchange time information GATT may be operable as a protocol that describes how ATT is used in the configuration of services. For example, GATT may be operable to specify how ATT attributes are grouped together into services, and may be operable to describe characteristics associated with services.

Thus, GATT and ATT can use features to describe the status and services of a device, how they relate to each other and how they are used.

The controller stack includes a physical layer (590), a link layer (580), and a host controller interface (570).

The physical layer (wireless transmission/reception module, 590) is a layer that transmits and receives 2.4 GHz radio signals and uses GFSK (Gaussian Frequency Shift Keying) modulation and a frequency hopping technique consisting of 40 RF channels.

Link layer 580 transmits or receives Bluetooth packets.

In addition, the link layer creates a connection between devices after performing advertising and scanning functions using 3 advertising channels, and provides a function of exchanging data packets of up to 42 bytes through 37 data channels.

HCI (Host Controller Interface) provides an interface between the host stack and the controller stack, allowing the host stack to provide commands and data to the controller stack, and the controller stack to provide events and data to the host stack.

Hereinafter, procedures of Bluetooth Low Energy (BLE) technology will be briefly reviewed.

The BLE procedure may be divided into a device filtering procedure, an advertising procedure, a scanning procedure, a discovering procedure, and a connecting procedure.

Device Filtering Procedure

The device filtering procedure is a method for reducing the number of devices performing responses to requests, instructions, notifications, etc. in the controller stack.

When a request is received by all devices, since it is not necessary to respond to it, the controller stack can control the BLE controller stack to reduce power consumption by reducing the number of requests sent.

An advertising device or a scanning device may perform the above device filtering procedure to restrict devices receiving advertising packets, scan requests, or connection requests.

Here, the advertisement device refers to a device that transmits an advertisement event, that is, performs an advertisement, and is also referred to as an advertiser.

A scanning device refers to a device that performs scanning and a device that transmits a scan request.

In BLE, when a scanning device receives some advertising packets from an advertising device, the scanning device should send a scan request to the advertising device.

However, when the device filtering procedure is used and transmission of the scan request is unnecessary, the scanning device may ignore advertisement packets transmitted from the advertisement device.

A device filtering procedure may also be used in the connection request process. If device filtering is used in the connection request process, it is not necessary to transmit a response to the connection request by ignoring the connection request.

Advertising Procedure

The advertising device performs an advertising procedure to perform non-directional broadcasting to devices within the area.

Here, non-directional broadcast refers to broadcast in all (all) directions rather than broadcast in a specific direction.

In contrast, directional broadcast refers to broadcasting in a specific direction. Non-directional broadcasting occurs between an advertising device and a device in a listening (or listening) state (hereinafter referred to as a listening device) without a connection procedure.

The advertising procedure is used to establish a Bluetooth connection with a nearby initiating device.

Alternatively, the advertising procedure may be used to provide periodic broadcast of user data to scanning devices that are listening on the advertising channel.

In the advertisement process, all advertisements (or advertisement events) are broadcast through advertisement physical channels.

Advertising devices may receive scan requests from listening devices that are listening to obtain additional user data from the advertising device. The advertising device transmits a response to the scan request to the device that sent the scan request through the same advertising physical channel as the advertising physical channel that received the scan request.

Broadcast user data sent as part of advertisement packets is dynamic data, whereas scan response data is generally static data.

An advertising device may receive a connection request from an initiating device on an advertising (broadcast) physical channel. If the advertising device uses a connectable advertising event and the initiating device is not filtered by the device filtering procedure, the advertising device stops advertising and enters a connected mode. The advertising device may start advertising again after the connection mode.

Scanning Procedure

A device that performs scanning, that is, a scanning device performs a scanning procedure to listen to a non-directional broadcast of user data from advertising devices using an advertising physical channel.

The scanning device transmits a scan request to the advertising device through an advertising physical channel to request additional user data from the advertising device. The advertising device transmits a scan response, which is a response to the scan request, including additional user data requested by the scanning device through the advertising physical channel.

The scanning procedure may be used while being connected to another BLE device in a BLE piconet.

If the scanning device receives a broadcast advertising event and is in an initiator mode capable of initiating a connection request, the scanning device transmits a connection request to the advertising device through the advertising physical channel, thereby and start a Bluetooth connection.

When the scanning device sends a connection request to the advertising device, the scanning device stops initiator mode scanning for additional broadcasting and enters a connection mode.

Discovering Procedure

Devices capable of Bluetooth communication (hereinafter referred to as 'Bluetooth devices') perform advertising and scanning procedures to discover nearby devices or to be discovered by other devices within a given area.

The discovery procedure is performed asymmetrically. A Bluetooth device trying to find other devices around it is called a discovering device, and it listens to find for devices advertising scannable advertising events. A Bluetooth device discovered and available from other devices is called a discoverable device, and actively broadcasts an advertisement event through an advertisement (broadcast) physical channel so that other devices can scan it.

Both the discovering device and the discoverable device may already be connected to other Bluetooth devices in the piconet.

Connecting Procedure

The connection procedure is asymmetric, and the connection procedure requires that another Bluetooth device perform a scanning procedure while a specific Bluetooth device performs an advertising procedure.

That is, the advertisement process can be targeted, so that only one device will respond to the advertisement. After receiving an accessible advertising event from the advertising device, connection may be initiated by transmitting a connection request to the advertising device through an advertising (broadcast) physical channel.

Next, operation states in the BLE technology, that is, an advertising state, a scanning state, an initiating state, and a connection state will be briefly reviewed.

Advertising State

The Link Layer (LL) enters the advertised state, at the direction of the host (stack). When the link layer is in the advertising state, the link layer transmits advertising packet data units (PDUs) in advertising events.

Each advertising event consists of at least one advertising PDU, and the advertising PDUs are transmitted through the used advertising channel indices. The advertising event may be terminated when the advertising PDU is transmitted through each of the advertising channel indexes used, or the advertising event may be terminated earlier if the advertising device needs to secure space for performing other functions.

Scanning State

The link layer enters the scanning state at the direction of the host (stack). In the scanning state, the link layer listens for advertising channel indices.

There are two types of scanning states: passive scanning and active scanning, and each scanning type is determined by the host.

A separate time or advertising channel index for performing scanning is not defined.

During the scanning state, the link layer listens for an advertising channel index during the scanWindow duration. The scanInterval is defined as the interval (interval) between the starting points of two consecutive scan windows.

The link layer should listen for completion of all scan intervals in the scan window, as directed by the host, if there are no scheduling conflicts. In each scan window, the link layer has to scan different advertising channel indices. The link layer uses all available advertising channel indices.

When passive scanning, the link layer only receives packets and does not transmit any packets.

When active scanning, the link layer performs listening to rely on the Advertising PDU type to be able to request Advertising PDUs from the Advertising Device and additional information related to the Advertising Device.

Initiating State

The link layer enters the initiation state at the direction of the host (stack).

When the link layer is in the initiating state, the link layer listens for advertising channel indices.

During the initiation state, the link layer listens to the advertising channel index during the scan window period.

Connection State

The link layer enters the connected state when the device making the connection request, that is, when the initiating device sends a CONNECT_REQ PDU to the advertising device or when the advertising device receives a CONNECT_REQ PDU from the initiating device.

After entering the connected state, the connection is considered to be created. However, it need not be considered to be established at the time when the connection enters the connected state. The only difference between a newly created connection and an established connection is the link layer connection supervision timeout value.

When two devices are connected, they act in different roles.

A link layer performing a master role is called a master, and a link layer performing a slave role is called a slave. The master controls the timing of the connection event, and the connection event refers to the timing of synchronization between the master and the slave.

Hereinafter, packets defined in the Bluetooth interface will be briefly reviewed. BLE devices use packets defined below.

Packet Format

The Link Layer has only one packet format used for both Advertising Channel Packets and Data Channel Packets.

Each packet consists of four fields: Preamble, Access Address, PDU, and CRC.

When one packet is transmitted on an advertising physical channel, the PDU will be an advertising channel PDU, and when one packet is transmitted on a data physical channel, the PDU will be a data channel PDU.

Advertising Channel PDU (Advertising Channel PDU)

An advertising channel PDU (PACKet Data Unit) has a 16-bit header and payloads of various sizes.

The PDU type field of the advertising channel PDU included in the header indicates the PDU type as defined in Table 1 below.

TABLE 1

| PDU Type | PACKet Name |
|---|---|
| 0000 | ADV-IND |
| 0001 | ADV_DIRECT_IND |
| 0010 | ADV_NONCONN_IND |
| 0011 | SCAN_REQ |
| 0100 | SCAN_RSP |
| 0101 | CONNECT_REQ |
| 0110 | ADV_SCAN_IND |
| 0111-1111 | Reserved |

Advertising PDU

The advertising channel PDU types below are referred to as advertising PDUs and are used in specific events.

ADV_IND: chainable non-directional advertising event

ADV_DIRECT_IND: directive advertising events that can be chained

ADV_NONCONN_IND: non-connectable non-direction advertising event

ADV_SCAN_IND: scannable non-directional ad event

The PDUs are transmitted in the link layer in an advertising state and received by the link layer in a scanning state or initiating state.

Scanning PDUs

The advertising channel PDU type below is called a scanning PDU and is used in the conditions described below.

SCAN_REQ: Sent by the link layer in the scanning state and received by the link layer in the advertising state.

SCAN_RSP: Sent by the link layer in the advertising state and received by the link layer in the scanning state.

Initiating PDUs

The advertising channel PDU type below is called an initiation PDU.

CONNECT_REQ: Sent by the link layer in the initiating state and received by the link layer in the advertising state.

Data Channel PDUs

A data channel PDU has a 16-bit header, payloads of various sizes, and may include a Message Integrity Check (MIC) field.

As discussed above, the procedures, states, packet formats, etc. in BLE technology can be applied to perform the methods proposed in this specification.

Figure 6:
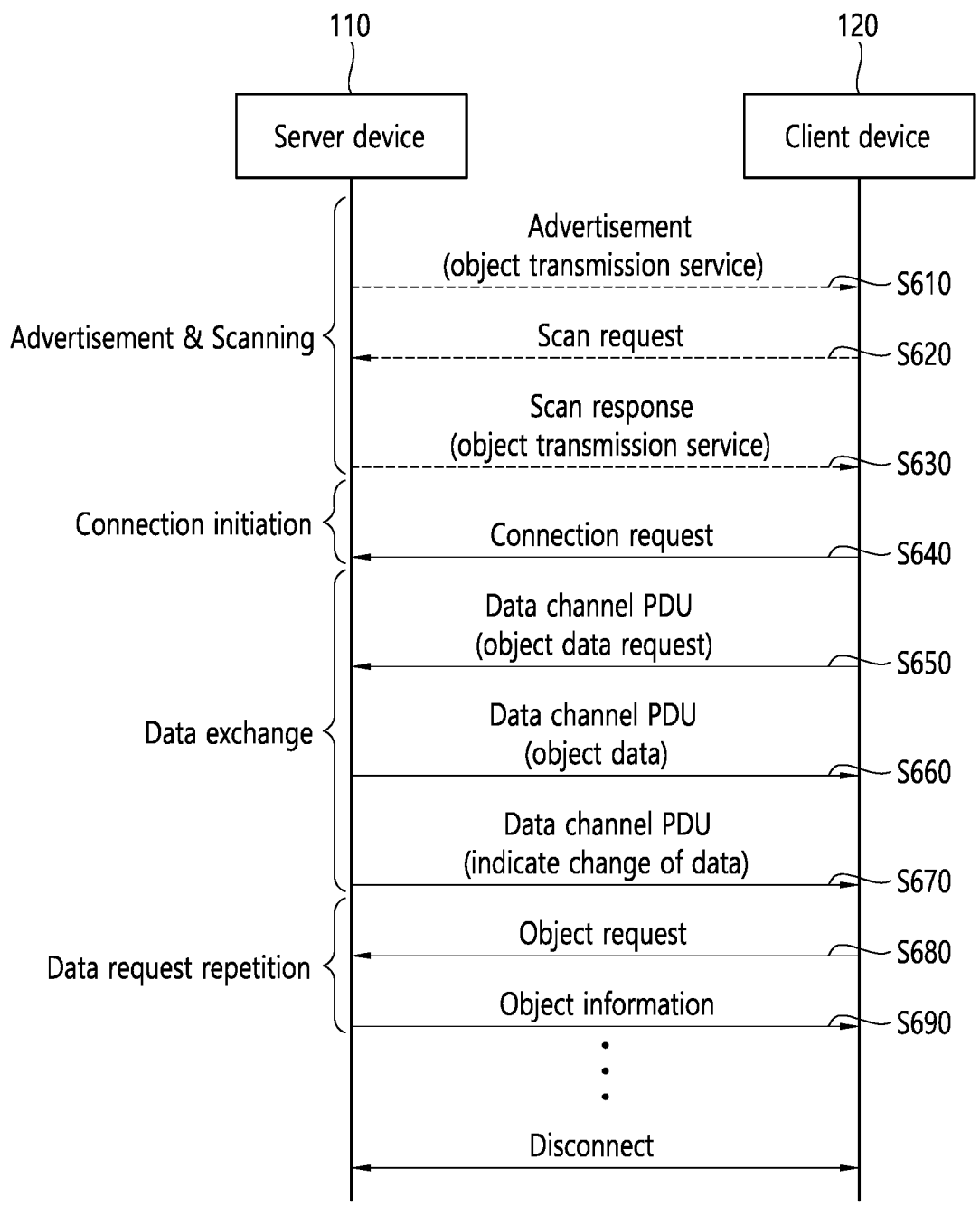
FIG. 6 is a flowchart illustrating an example of a method of providing an object transmission service in Bluetooth low energy technology.

FIG. 6 is a flowchart illustrating an example of a method of providing an object transmission service in Bluetooth low energy technology.

Object Delivery Service or Object Transfer Service refers to a service supported by BLE to transmit or receive objects or data such as bulk data in Bluetooth communication.

An advertisement process and a scanning process corresponding to steps S610 to S630 are performed to establish a Bluetooth connection between the server device and the client device.

First, the server device transmits an advertisement message to the client device to notify information related to the server device including the object transmission service (S610).

The advertisement message may be expressed as an advertisement packet data unit (PDU), advertisement packet, advertisement, advertisement frame, advertisement physical channel PDU, and the like.

The advertisement message may include service information provided by the server device (including service name), the name of the server device, manufacturer data, and the like.

Also, the advertisement message may be transmitted to the client device in a broadcast method or a unicast method.

Thereafter, the client device transmits a scan request message to the server device in order to obtain more detailed information related to the server device (S620).

The scan request message may be expressed as a scanning PDU, a scan request PDU, a scan request, a scan request frame, or a scan request packet.

Thereafter, the server device transmits a scan response message to the client device in response to the scan request message received from the client device (S630).

The scan response message includes server device related information requested by the client device. Here, the server device-related information may be an object or data transmittable by the server device in relation to providing an object transmission service.

When the advertisement process and the scanning process end, the server device and the client device perform a connection initiating process and a data exchange process corresponding to steps S640 to S670.

Specifically, the client device transmits a Connect Request message to the server device for a Bluetooth communication connection with the server device (S640).

The connection request message may be expressed as a connection request PDU, an initiation PDU, a connection request frame, or a connection request.

Through step S640, a Bluetooth connection is established between the server device and the client device, and then the server device and the client device exchange data. During the data exchange process, data may be transmitted and received through a data channel PDU.

The client device transmits an object data request to the server device through a data channel PDU (S650). The data channel PDU may be expressed as a data request message or data request frame.

Then, the server device transmits the object data requested by the client device to the client device through a data channel PDU (S660).

Here, the data channel PDU is used to provide data or request data information to a counterpart device in a manner defined in the Attribute protocol.

Thereafter, when data change occurs in the server device, the server device transmits data change indication information through a data channel PDU to the client device to inform the change of data or object (S670).

Then, the client device requests changed object information to the server device to find the changed data or changed object (S680).

Thereafter, the server device transmits object information changed in the server device to the client device in response to the changed object information request (S690).

Thereafter, the client device finds a changed object through a comparative analysis of the received changed object information and object information currently possessed by the client device.

However, the client device repeatedly performs steps S680 to S690 until the changed object or data is found.

Thereafter, when the connection state between the host device and the client device does not need to be maintained, the host device or the client device may disconnect the corresponding connection state.

When you board a plane to go on a business trip or a trip, you can use IFE (In Flight Entertainment) located in front of your seat during flight time. Flight attendants distribute earphones. For various reasons, there are many cases where you want to use PED (Portable Electronic Device), but it is not possible in the current system.

Hereinafter, a UX (User Experience) that can easily use PED (Portable Electronic Device) in IFE (In Flight Entertainment) is proposed.

To perform wireless communication between two devices using Bluetooth communication, a user must search for a target device to communicate with and perform a procedure for requesting a connection. To connect the IFE and PED, the user must enter the PED into pairing mode and make the PED discoverable.

The method of entering Pairing Mode (Discoverable) can be different for each PED that supports Bluetooth, and the user has to read the manual to check how to enter Pairing Mode, which is inconvenient. After that, the user must directly select and connect the Discoverable device. If there are many discovered devices, it may be difficult for the user to determine which Target Device (i.e., the PED the user is trying to connect to) is.

In particular, in a mixed and complex environment with many narrow devices, notifications are sent to all nearby source displays when advertising is performed, but it is difficult for users to distinguish the target device as in the previous technology.

In order to solve this problem, a method for easy Bluetooth search and connection is proposed below.

Figure 7:
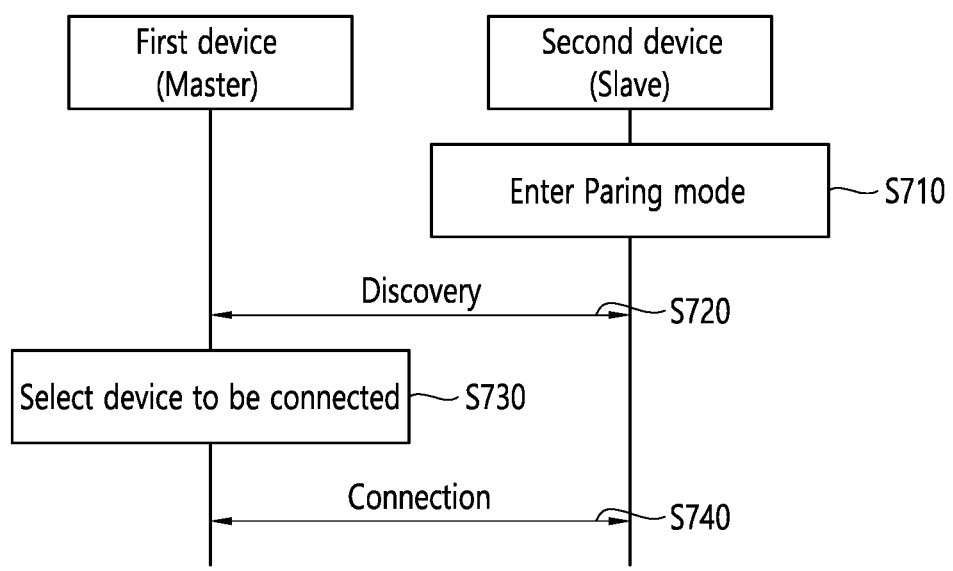
FIG. 7 is a flowchart illustrating an embodiment of a connection method of a Bluetooth device supporting BR/EDR (basic rate/enhanced data rate).

FIG. 7 is a flowchart illustrating an embodiment of a connection method of a Bluetooth device supporting BR/EDR (basic rate/enhanced data rate).

Referring to FIG. 7, a first device and a second device may perform a Bluetooth connection. For example, the first device may be a master device, and the second device may be a slave device. For example, the first device may be a smart phone, and the second device may be a PED (e.g., Bluetooth headset, Bluetooth earphone, etc.).

In order for the first device and the second device to be connected, user intervention may be required three times. For example, the user may enter the second device into a pairing mode and initiate a discovery procedure of the first device. Thereafter, the user may select a device (i.e., a second device) to be connected from the first device after completing the discovery procedure. When there are many devices around, since there are many options to be selected, it may be difficult for the user to discern which device to connect (i.e., which device is the second device).

The second device may enter Paring Mode (S710).

The first device and the second device may perform a discovery procedure (S720). For example, the first device may transmit a search signal, and the second device receiving the search signal may transmit a search response signal.

The first device may select a device to be connected (S730). For example, the first device may receive a search response signal from the second device and select a device (e.g., the second device) to connect based on the search response signal.

The first device and the second device may be connected (S740). For example, the first device may transmit a connection signal to the second device, and the second device may transmit a connection response signal to the first device.

Figure 8:
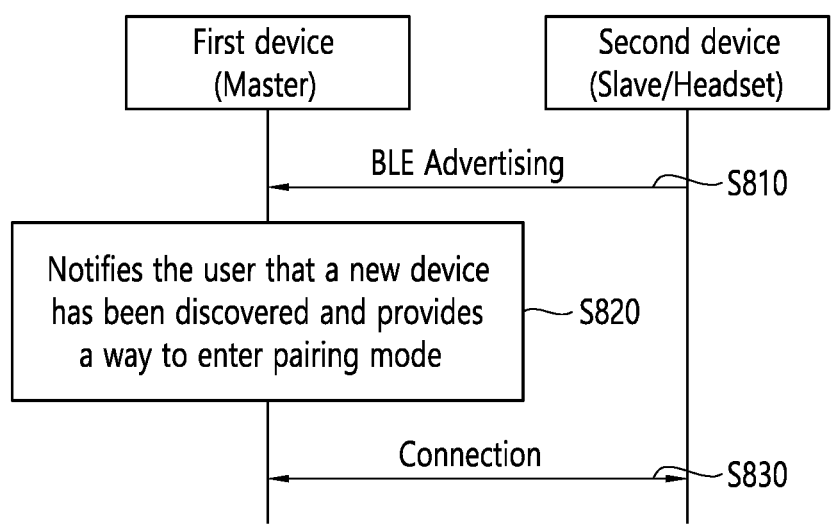
FIG. 8 is a flowchart illustrating an embodiment of a method for connecting a Bluetooth device supporting Bluetooth Low Energy (BLE).

FIG. 8 is a flowchart illustrating an embodiment of a method for connecting a Bluetooth device supporting Bluetooth Low Energy (BLE).

Referring to FIG. 8, a first device and a second device may perform a Bluetooth connection. The first device and the second device may perform a Bluetooth connection. For example, the first device may be a master device, and the second device may be a slave device. For example, the first device may be a smart phone, and the second device may be a PED (e.g., Bluetooth headset, Bluetooth earphone, etc.).

The second device may transmit a BLE Advertising signal (S810). The BLE Advertising signal may be transmitted in a broadcasting method. That is, the BLE Advertising signal can be transmitted to all nearby devices. For example, when a case of a wireless earphone is opened, a BLE Advertising signal may be transmitted.

The first device may receive a BLE Advertising signal from the second device. The first device may transmit information that a new device has been discovered to the user (S820). For example, the first device may show information that a new device (i.e., the second device) has been discovered on the display. For example, the first device may transmit information related to whether to perform pairing with a new device to the user (S820). For example, the first device may show information related to whether to perform pairing with a new device on the display.

When obtaining information related to pairing with the second device from the user, the first device may perform a connection with the second device (S830). For example, the first device may transmit a connection signal to the second device, and the second device may transmit a connection response signal to the first device.

Recently, headsets that support easy connection to users using BLE Advertising are increasing. Airpods are a typical example. When you open the case of Airpods, BLE Advertising starts and a notification that new Airpods are detected appears on all devices that receive it.

At this time, if you press the Pairing Button, a new device is connected. It is convenient to use with an easy UX.

However, it may not be appropriate in an environment with many devices around, such as IFE. This is because a notification pops up on all devices that receive BLE Advertising, and due to the nature of IFE, a notification pops up on all devices around it in a dense space, making it difficult to find a device to connect to and the notification can cause inconvenience to other devices.

Hereinafter, a method for Bluetooth search and connection in an environment where space is narrow and many devices are mixed, such as an airplane, is proposed.

The problems of Bluetooth connection of PED devices in a narrow environment such as an airplane where many devices are mixed are as follows.

BR/EDR device: All Inquiry Scan devices in the scan range of IFE devices are listed, but it can cause inconvenience to the user as it needs to be checked only with the alias name or BD ADDR (Bluetooth Device address) of the device to be connected.

BLE device: Notifications can appear on all nearby IFE devices through BLE Adverting, so notifications can cause inconvenience to other users in a narrow environment where many devices are mixed.

It is very inconvenient and difficult for a user to directly select a device to connect to in an environment where many devices are mixed, such as on an airplane. Therefore, user experience that can be easily known and used is necessary.

Figure 9:
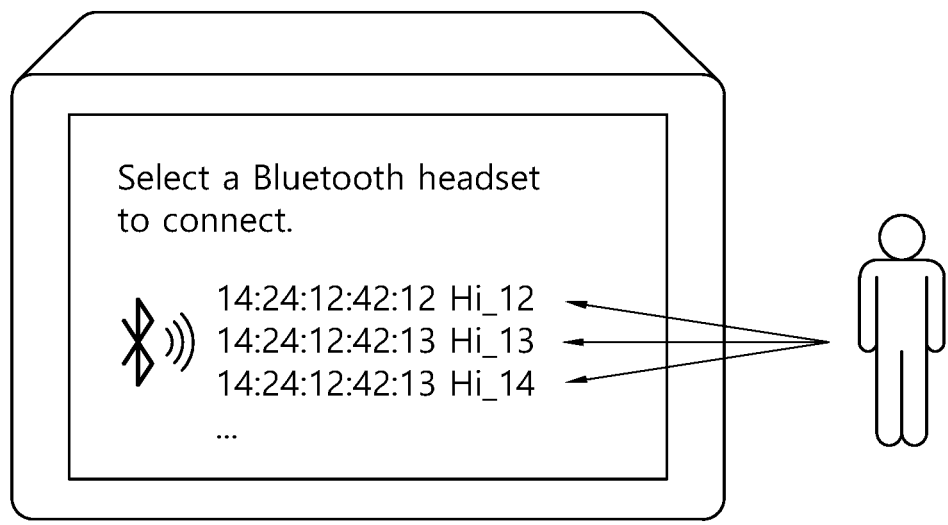
FIG. 9 is a diagram illustrating an embodiment of an IFE device attempting to connect with a BR/EDR device.

FIG. 9 is a diagram illustrating an embodiment of an IFE device attempting to connect with a BR/EDR device.

Referring to FIG. 9, the IFE device may perform a search for a Bluetooth device to connect with a BR/EDR device. For example, the IFE device may transmit a Bluetooth discovery signal. Several Bluetooth devices may be searched for in an environment such as inside an airplane in which several Bluetooth devices (e.g., BR/EDR devices) are mixed around. It may be difficult for the user to find his/her own Bluetooth device (i.e., BR/EDR device) among several Bluetooth devices found in the IFE device.

Figure 10:
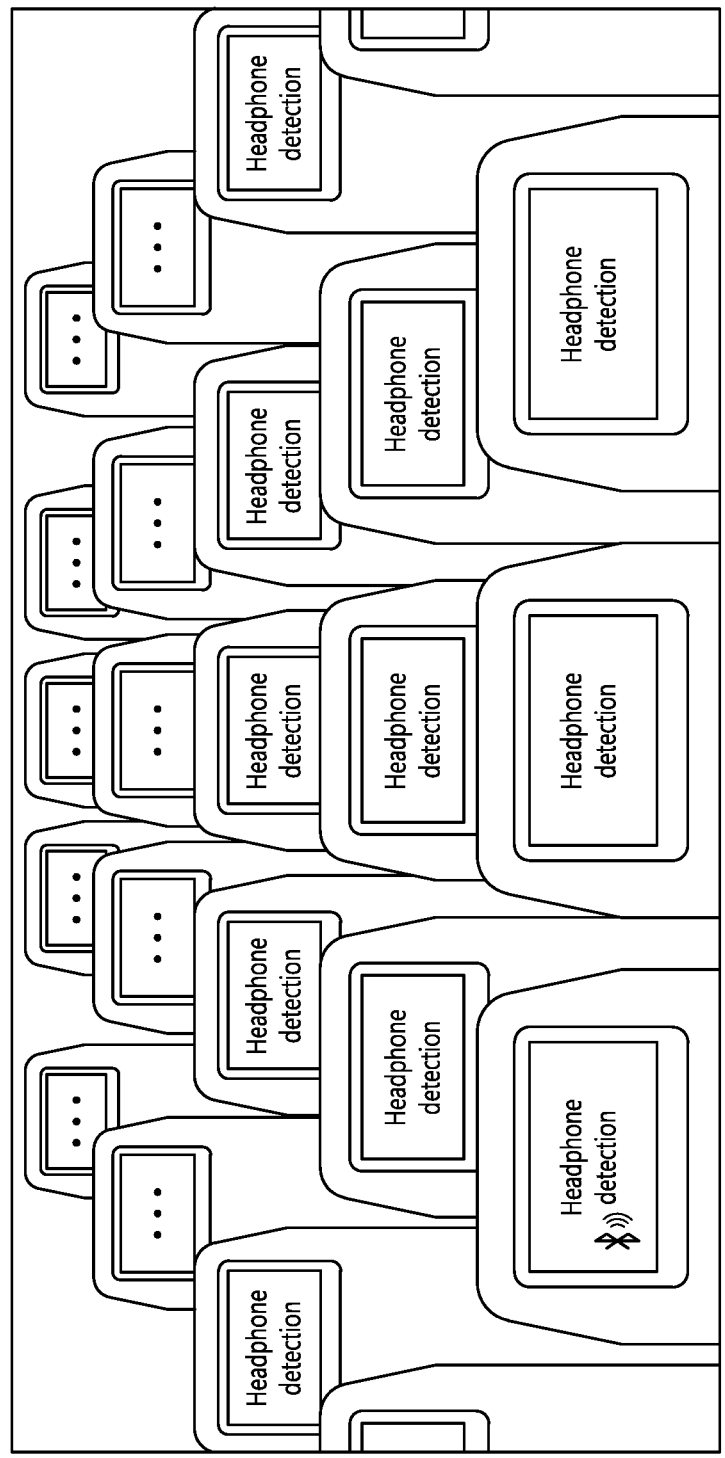
FIG. 10 is a diagram showing an example of a situation that occurs when a BLE device attempts to connect with an IFE device.

FIG. 10 is a diagram showing an example of a situation that occurs when a BLE device attempts to connect with an IFE device.

Referring to FIG. 10, a BLE device may transmit a BLE Advertising signal for connection with an IFE device. In an environment such as inside an airplane where several Bluetooth devices (e.g., IFE devices) are mixed around, all of the various Bluetooth devices (e.g., IFE devices) can receive BLE Advertising signals. Therefore, as shown in FIG. 10, since the IFE devices of other users other than the user's IFE device also receive the BLE advertising signal of the BLE device, a notification is displayed on all nearby IFE devices, causing inconvenience to other users.

Figure 11:
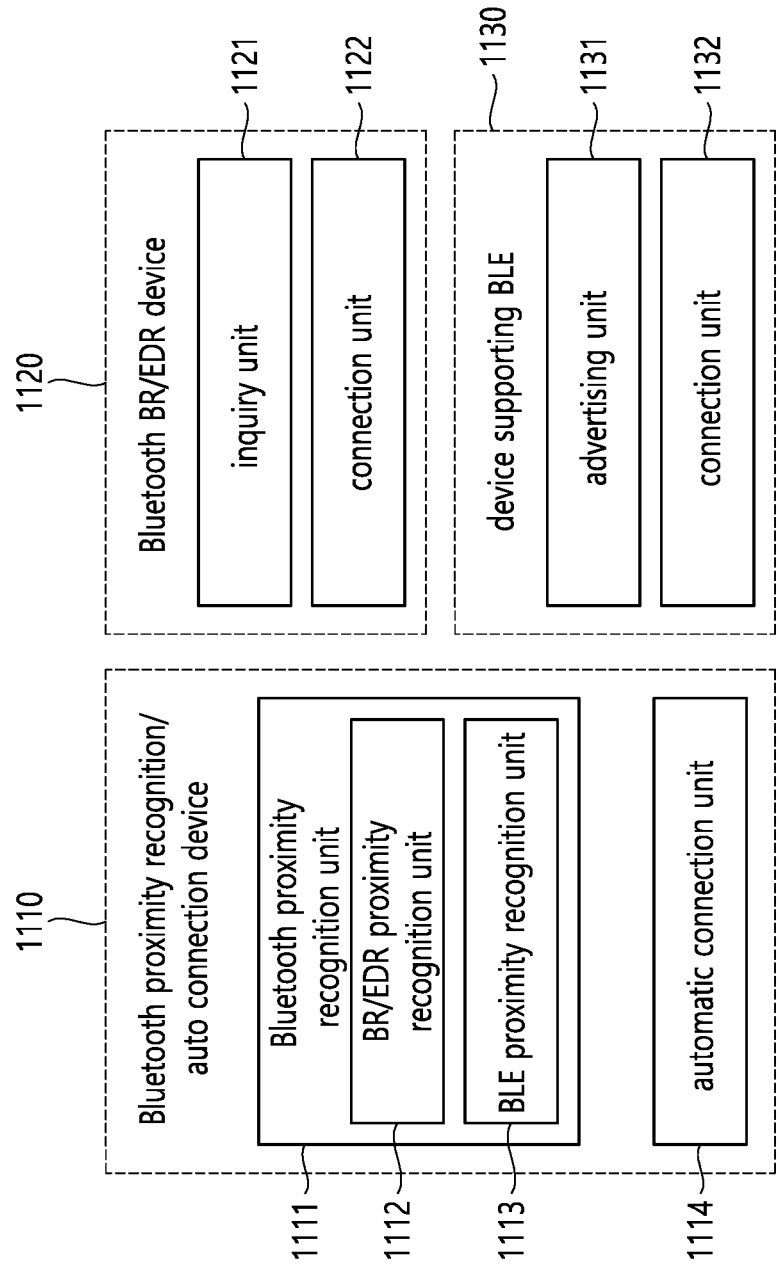
FIG. 11 is a diagram showing an example of an IFE device, a BR/EDR device, and a BLE device.

FIG. 11 is a diagram showing an example of an IFE device, a BR/EDR device, and a BLE device.

Referring to FIG. 11, the IFE device may include a Bluetooth proximity recognition/auto connection device 1110, and the Bluetooth proximity recognition/auto connection device 1110 includes a Bluetooth proximity recognition unit 1111 and a BR/EDR proximity recognition unit. 1112, a BLE proximity recognition unit 1113, and an automatic connection unit 1114.

The Bluetooth proximity recognition unit 1111 may perform a function of recognizing the proximity of another Bluetooth device. The Bluetooth proximity recognition unit 1111 may include a BR/EDR proximity recognition unit 1112 and a BLE proximity recognition unit 1113.

The BR/EDR proximity recognition unit 1112 may perform a function of recognizing the proximity of a Bluetooth device supporting BR/EDR. The BR/EDR proximity recognition unit 1112 can recognize nearby devices by limiting the search range through TX power adjustment for Bluetooth Scan. For example, the BR/EDR proximity recognition unit 1112 may perform only a search for a nearby Bluetooth device by reducing the size of the transmission power of the Bluetooth search signal.

The BLE proximity recognition unit 1113 may perform a function of recognizing the proximity of a Bluetooth device supporting BLE. The BLE proximity recognition unit 1113 may recognize a nearby device using a received signal strength indication (RSSI) value included in a BLE advertising packet during a Bluetooth scan.

The automatic connection unit 1114 may perform automatic connection using the information of the proximity device recognized and acquired by the Bluetooth proximity recognition unit 1111.

The Bluetooth BR/EDR device 1120 may include an inquiry unit 1121 and a connection unit 1122. The Inquiry unit 1121 may perform a function of entering a state for a BR/EDR device to respond to a Bluetooth Scan. The connection unit 1122 may perform a Bluetooth connection.

The BLE device 1130 may include an advertising unit 1131 and a connection unit 1132. The Advertising unit 1131 may perform Advertising of Bluetooth devices supporting BLE. The connection unit 1132 may perform a Bluetooth connection.

Hereinafter, a method for easily connecting a BR/EDR device and a BLE-enabled device to an IFE is described. The IFE device can simultaneously perform BR/EDR and BLE Scan by applying a Time Division method. According to the present specification, an easy BLE, BR/EDR automatic connection method can be performed in a complex space such as inside an airplane.

The IFE device may include the Bluetooth proximity recognition/auto connect device 1110 of FIG. 11. The Bluetooth proximity recognition unit 1111 can simultaneously perform a BR/EDR scan through the BR/EDR proximity recognition unit 1112 and a BLE scan through the BLE proximity recognition unit 1113 in the following way to find a nearby device.

BR/EDR Proximity Recognition Unit 1112: Scan (Inquiry Request) may be performed by limiting the search range to the corresponding seat area by a method of adjusting the transmit power (Tx Power) of the IFE device.

BLE proximity recognition unit 1113: The IFE device may proceed with a BLE Advertising Scan. Scan results can include only nearby devices in the same way as RSSI. For example, the IFE device may include only BLE devices in which the RSSI value of the BLE Advertising signal is greater than a preset threshold in the search result.

The BR/EDR proximity recognition unit 1112 and the BLE proximity recognition unit 1113 may use a method such as Time Division to simultaneously perform a Bluetooth search. For example, the IFE device may perform a BR/EDR search in a first time interval and a BLE search in a second time interval.

A Bluetooth device (e.g., a device supporting BR/EDR or BLE) may include an Inquiry unit 50 and an Advertising unit 70 according to a support type. For example, a device supporting BR/EDR may include an inquiry unit 1121 and a connection unit 1122. For example, a device supporting BLE may include an advertising unit 1131 and a connection unit 1132.

The IFE device may enter a ready state for proximity recognition of a Bluetooth device (e.g., a device supporting BR/EDR or BLE) through the Bluetooth proximity recognition unit 1111.

When a Bluetooth device (e.g., a device supporting BR/EDR or BLE) approaches, the Bluetooth proximity recognition unit 1111 may recognize the proximity of the Bluetooth device.

When the IFE device finds a nearby BR/EDR device, if there is only one BR/EDR device found, it can automatically connect without user intervention. If there are two or more BR/EDR devices found by the IFE device, the BD ADDR (Bluetooth Device address) and Alias Name are listed on the display of the IFE device, and a nearby device can be ranked higher based on the RSSI value of the search response signal (That is, a device with a high RSSI value can be placed on top).

Users can select their device to connect to. For example, the user can know that the device listed at the top is his device based on the listing order, and can select his/her Bluetooth device to connect to the IFE device.

IFE devices can find nearby BLE-enabled devices. An Advertising Packet transmitted by a BLE-enabled device may include connection information (e.g., BD Addr. Device manufacturer and type, etc.). The BLE proximity recognition unit 1113 may utilize connection information as automatic connection information.

The IFE device may rank a nearby device based on the RSSI value of the BLE Advertising signal received through the BLE proximity recognition unit 1113 (i.e., a device with a high RSSI value). At this time, proximity recognition is performed by setting a threshold, and the threshold can be set to a general value or a whitelist-type method that sets a value specific to each manufacturer can be applied. For example, the IFE device may set a Threshold value of RSSI of a BLE Advertising signal, and may include a BLE device that has transmitted an Advertising signal having an RSSI value exceeding the Threshold value in the search result. For example, the threshold value may be set to a value specific to each manufacturer and each device based on a preset whitelist.

The IFE device measures the RSSI of the BLE device's BLE Advertising signal, and if it is greater than the threshold, it determines that the BLE device is close, and can attempt automatic connection based on the connection information of the advertising packet (e.g. BD Addr, manufacturer information, etc.).

Figure 12:
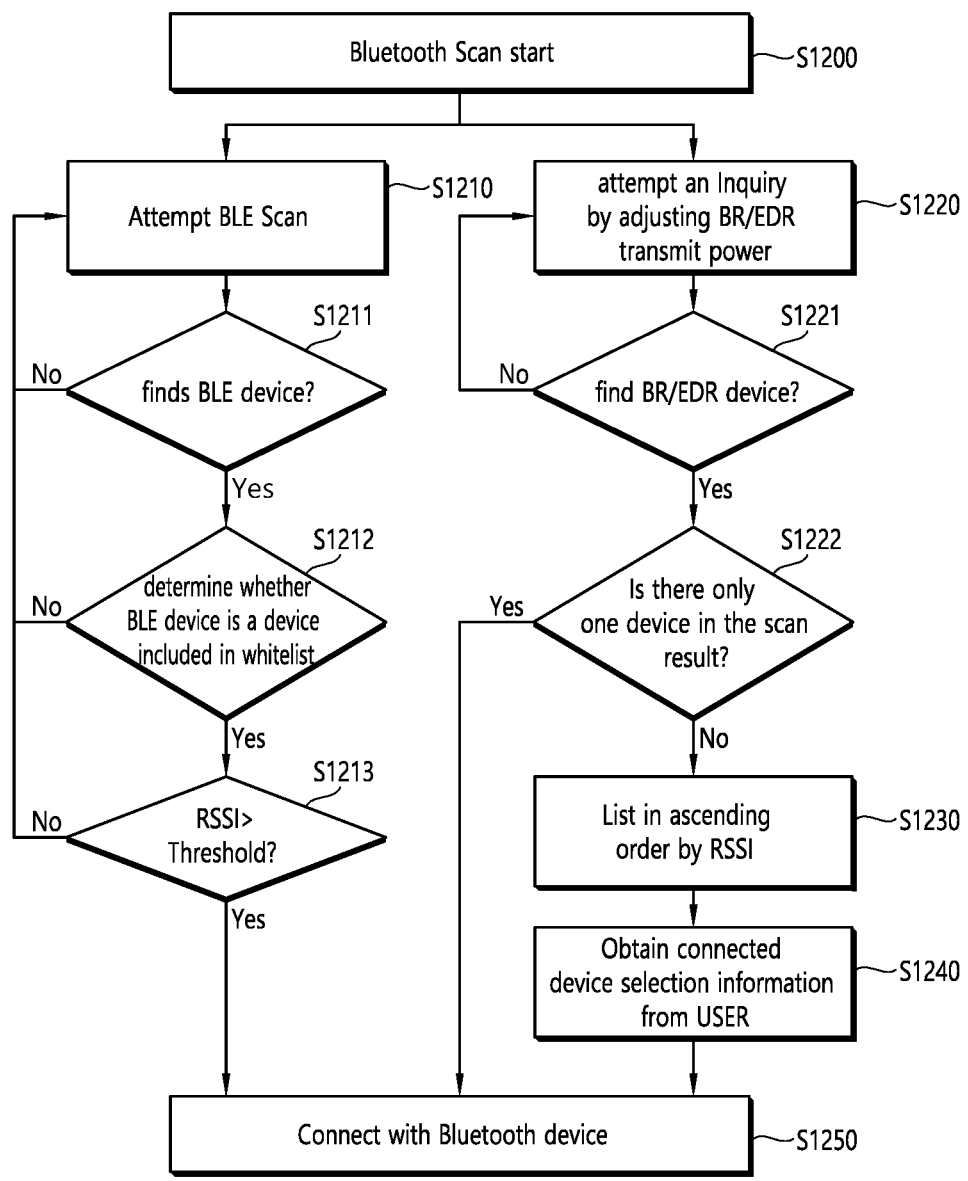
FIG. 12 is a flowchart illustrating an embodiment of a method of operating an IFE device.

FIG. 12 is a flowchart illustrating an embodiment of a method of operating an IFE device.

Referring to FIG. 12, the IFE device may perform a Bluetooth scan to find a Bluetooth device (e.g., a BR/EDR device or a BLE device) to be connected.

The IFE device may start a Bluetooth scan (S1200). For example, the IFE device may perform a search for Bluetooth devices. The Bluetooth device search performed by the IFE device may include a search for a BLE device and a search for a Bluetooth BR/EDR device.

The IFE device may attempt BLE Scan (S1210). For example, an IFE device may perform a search for BLE devices. For example, BLE device discovery by an IFE device may be a procedure for the IFE device to monitor a BLE Advertising signal. The IFE device may continue to attempt BLE Scan until it finds a BLE device (S1211).

When the IFE device finds a BLE device (S1211), it can determine whether the BLE device is a device included in the whitelist (S1212). For example, the IFE device may attempt BLE Scan again when the BLE device is not a device included in the whitelist (S1210). For example, if the BLE device is a device included in the whitelist, the IFE device may determine whether the RSSI value of the advertising signal of the BLE device is greater than a preset threshold (S1213). The IFE device may perform BLE Scan again if the RSSI value of the advertising signal of the BLE device is less than or equal to a preset threshold (S1210). For example, the IFE device may perform a connection with the BLE device if the RSSI value of the advertising signal of the BLE device is greater than a preset threshold (S1250).

The IFE device may attempt to search for a Bluetooth BR/EDR device (S1220). For example, an IFE device may attempt an Inquiry about a Bluetooth BR/EDR device. For example, the IFE device may perform a search for a Bluetooth BR/EDR device by adjusting transmit power. For example, the IFE device may set the transmission power lower than a preset threshold and only attempt to search for nearby Bluetooth BR/EDR devices. The BR/EDR Scan may include a procedure in which the IFE device transmits a search signal for the BR/EDR device and receives a search response signal from the BR/EDR device.

The IFE device may continue to attempt BR/EDR Scan until it finds a Bluetooth BR/EDR device (S1221).

When the IFE device finds a BR/EDR device (S1221), it can determine whether the BR/EDR device found is one or two or more (S1222). If there is one BR/EDR device found, the IFE device can perform a connection with the BR/EDR device found (S1250). If there are two or more BR/EDR devices searched, the IFE device may sort in ascending order in the order of BR/EDR devices having a higher RSSI value based on the RSSI value of the search response signal received from the BR/EDR device (S1230).

The IFE device may obtain selection information about a device to be connected from the user (S1240). Since the searched BR/EDR devices are listed in the order of proximity on the display of the IFE device (that is, BR/EDR devices with high RSSI values are listed in order), the user can easily select his or her own device.

The IFE device may perform a connection with a device selected by the user (S1250).

Figure 13:
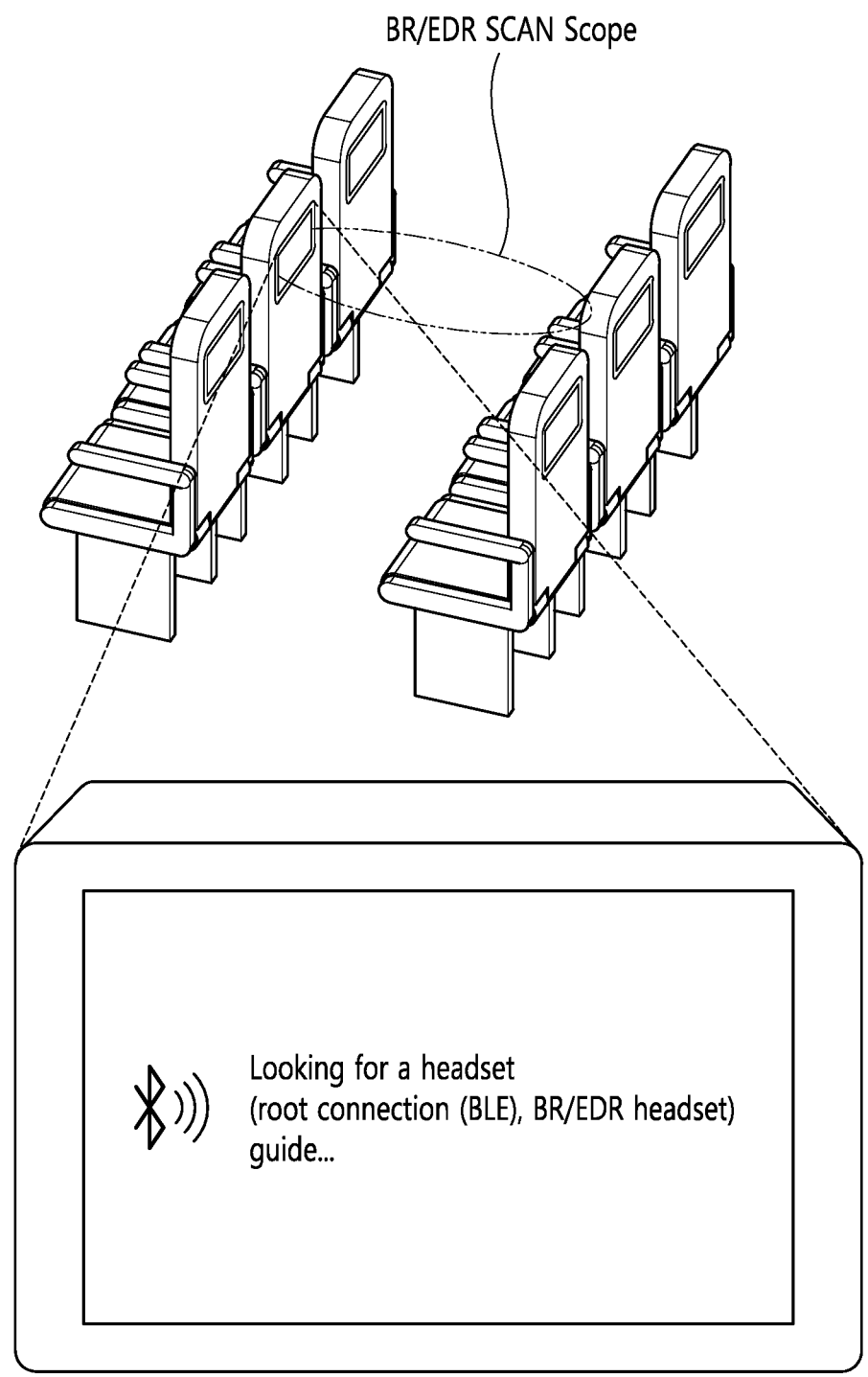
FIGS. 13 and 14 are diagrams illustrating an embodiment of an IFE device operation.
Figure 14:
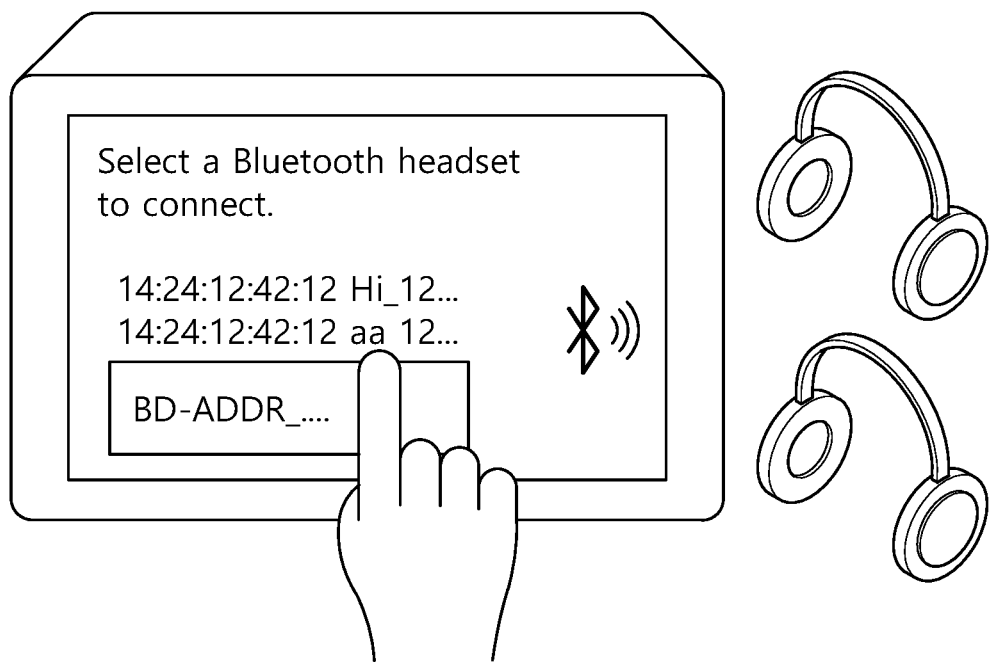

FIGS. 13 and 14 are diagrams illustrating an embodiment of an IFE device operation.

Referring to FIGS. 13 and 14, the IFE device may perform a search for a BR/EDR device. The IFE device may perform a search for a nearby BR/EDR device by setting the transmit power of the search signal low.

For example, the IFE device may transmit a search signal to search for a BR/EDR device. The search signal may be broadcast. The IFE device may perform a connection with the found BR/EDR device when there is one BR/EDR device found.

If the IFE device detects two or more BR/EDR devices, that is, if it receives a search response signal from two or more BR/EDR devices, the searched BR/EDR device list may be sorted based on the RSSI value of the received search response signal. For example, the IFE device can expose the device list by sorting in ascending order of BR/EDR devices with high RSSI values.

The user can select a device to connect to from the list of devices. The user can easily select the BR/EDR device he/she wants to connect to because the device exposed above has a higher RSSI value, that is, it can be a nearby device. For example, the device list may not be arithmetically sorted in ascending order of RSSI value, but may be sorted in ascending order of path loss by calculating path loss based on a whitelist pre-stored in the IFE device.

Upon obtaining BR/EDR device selection information from the user, the IFE device may perform a connection with the selected BR/EDR device.

Figure 15:
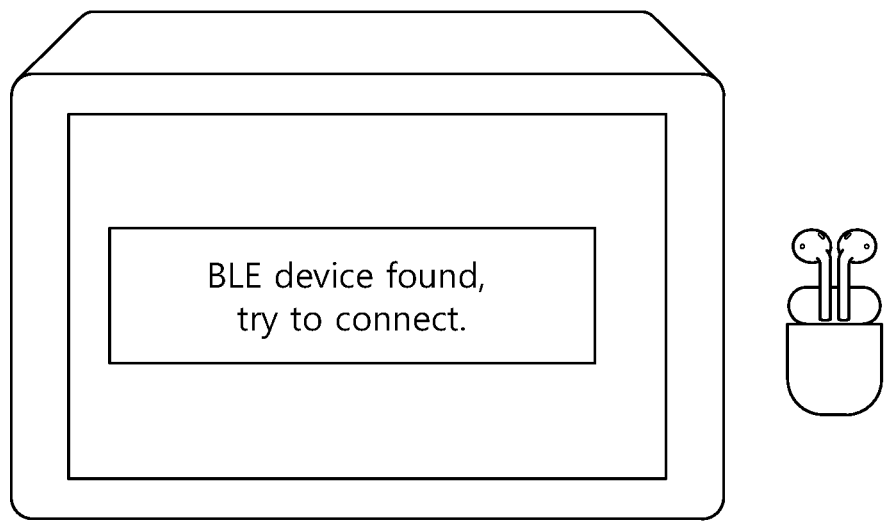
FIG. 15 is a diagram illustrating an embodiment of an IFE device operation.

FIG. 15 is a diagram illustrating an embodiment of an IFE device operation.

Referring to FIG. 15, the IFE device may perform a search for BLE devices. An RSSI threshold may be set in the IFE device as shown in Table 2.

TABLE 2

| Product name | Threshold |
|---|---|
| First device | -xxdBm |
| Second device | -xxdBm |
| Third device | -xxdBm |
| Fourth device | -xxdBm |
| Fifth device | -xxdBm |
| Sixth device | -xxdBm |

The IFE device may receive an Advertising Packet from a BLE device, and if the RSSI value of the Advertising Packet is greater than a threshold value based on the whitelist shown in Table 2, it may connect with the BLE device.

The IFE device may not perform a connection when the BLE device that has transmitted the advertising packet is a device that is not on the whitelist. For example, the IFE device may perform a connection with the BLE device when the BLE device transmitting the advertising packet is a device included in the whitelist (i.e., a supportable device) and exceeds the RSSI threshold.

For example, when an IFE device receives advertising packets from a plurality of BLE devices, the IFE device may sort the RSSI values of the advertising packets in ascending order. For example, a user may select his or her own device from among the aligned BLE devices, and the IFE device acquiring device selection information may perform a connection with the selected BLE device.

Figure 16:
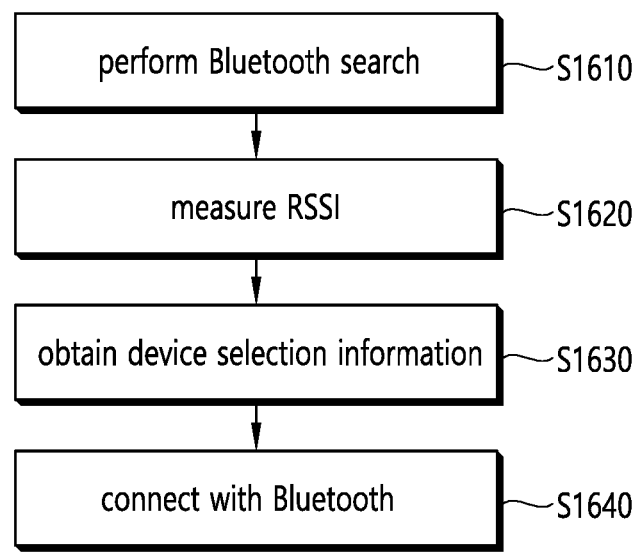
FIG. 16 is a diagram illustrating an embodiment of a method of operating an IFE device.

FIG. 16 is a diagram illustrating an embodiment of a method of operating an IFE device.

Referring to FIG. 16, the IFE device may perform a Bluetooth search (S1610). For example, the IFE device may perform a scan for a first Bluetooth low energy (BLE) device and a first Bluetooth basic rate/enhanced data rate (BR/EDR) device. The IFE device can simultaneously perform BR/EDR and BLE Scan by applying a Time Division method. For example, the IFE device may perform a BR/EDR search in a first time interval and a BLE search in a second time interval.

For example, an IFE device may perform a search for BLE devices. For example, BLE device discovery by an IFE device may be a procedure for the IFE device to monitor a BLE Advertising signal. The IFE device may continue to attempt BLE Scan until it finds a BLE device.

When the IFE device finds a BLE device, it can determine whether the BLE device is included in the whitelist. For example, the IFE device may attempt BLE Scan again if the BLE device is not a device included in the whitelist. For example, if the BLE device is a device included in the whitelist, the IFE device may determine whether the RSSI value of the advertising signal of the BLE device is greater than a preset threshold (S1620). The IFE device may perform a BLE scan again if the RSSI value of the advertising signal of the BLE device is less than or equal to a preset threshold. For example, the IFE device may perform a connection with the BLE device if the RSSI value of the advertising signal of the BLE device is greater than a preset threshold.

For example, when an IFE device receives advertising packets from a plurality of BLE devices, the IFE device may sort the RSSI values of the advertising packets in ascending order. For example, the user may select his or her own device from among the aligned BLE devices, and the IFE device may obtain device selection information from the user (S1630). The IFE device acquiring the device selection information may perform a connection with the selected BLE device (S1640).

The IFE device may attempt to search for Bluetooth BR/EDR devices. For example, an IFE device may attempt an Inquiry about a Bluetooth BR/EDR device. For example, the IFE device may perform a search for a Bluetooth BR/EDR device by adjusting transmit power. For example, the IFE device may set the transmission power lower than a preset threshold and only attempt to search for nearby Bluetooth BR/EDR devices. The BR/EDR Scan may include a procedure in which the IFE device transmits a search signal for the BR/EDR device and receives a search response signal from the BR/EDR device.

The IFE device may continue to attempt a BR/EDR scan until it finds a Bluetooth BR/EDR device.

When the IFE device finds a BR/EDR device, it can determine whether the BR/EDR device found is one or two or more. If there is one BR/EDR device found, the IFE device can perform a connection with the BR/EDR device found. If the IFE device finds two or more BR/EDR devices, it can measure the RSSI value of the search response signal (S1620). The IFE device may sort in ascending order in the order of BR/EDR devices having a higher RSSI value based on the RSSI value of the search response signal received from the BR/EDR device.

The IFE device may obtain selection information about a device to be connected from the user (S1630). Since the searched BR/EDR devices are listed in the order of proximity on the display of the IFE device (that is, BR/EDR devices with high RSSI values are listed in order), the user can easily select his or her own device.

The IFE device may perform a connection with a device selected by the user (S1640).

Some of the detailed steps shown in the example of FIG. 16 may not be essential steps and may be omitted. For example, in FIG. 16, RSSI measuring step (S1620) may be omitted. For example, the step of obtaining device selection information in FIG. 16 (S1630) may be omitted. For example, the order of the steps may vary. Some of the above steps may have their own technical meaning.

The technical features of the present specification described above may be applied to various devices and methods. For example, the technical features of the present specification described above may be performed/supported through the device of FIGS. 2 and/or 11. For example, the technical features of the present specification described above may be applied only to a part of FIG. 2 and/or FIG. 11. For example, the technical features of the present disclosure may be implemented based on the processor 124 of FIG. 2, or implemented based on the Bluetooth interfaces 116 and 126, the input units 112 and 122, the output units 111 and 121, the memories 115 and 125, the communication units 118 and 127, the control unit 114 and the processor 124 of FIG. 2, or implemented based on the Bluetooth proximity recognition/auto connection device 1110 of FIG. 11. For example, a device (or an apparatus) of the present specification includes a memory and a processor operatively coupled to the memory, the processor may be configured to perform a scan for a first Bluetooth low energy (BLE) device and a first Bluetooth basic rate/enhanced data rate (BR/EDR) device, wherein the scan for the first BLE device and the first Bluetooth BR/EDR device is performed in a time division (TD) method performed in different time intervals, wherein the scan for the first BLE device includes a step of receiving a first advertising signal of the first BLE device, wherein the scan for the first Bluetooth BR/EDR device includes a step of transmitting, by the IFE device, a scan signal; and receiving, by the IFE device, a first scan response signal from the first Bluetooth BR/EDR device; and perform a connection with the first BLE device or the first Bluetooth BR/EDR device.

The technical features of the present disclosure may be implemented based on a computer readable medium (CRM). For example, a CRM according to the present disclosure is at least one computer readable medium including instructions designed to be executed by at least one processor. The CRM may store instructions that perform operations including performing a scan for a first Bluetooth low energy (BLE) device and a first Bluetooth basic rate/enhanced data rate (BR/EDR) device, wherein the scan for the first BLE device and the first Bluetooth BR/EDR device is performed in a time division (TD) method performed in different time intervals, wherein the scan for the first BLE device includes a step of receiving a first advertising signal of the first BLE device, wherein the scan for the first Bluetooth BR/EDR device includes a step of transmitting, by the IFE device, a scan signal; and receiving, by the IFE device, a first scan response signal from the first Bluetooth BR/EDR device; and performing a connection with the first BLE device or the first Bluetooth BR/EDR device.

At least one processor may execute the instructions stored in the CRM according to the present disclosure. At least one processor related to the CRM of the present disclosure may be the processor 124 or the controller 114 of FIG. 2. Meanwhile, the CRM of the present disclosure may be the memories 115 and 125 of FIG. 1, or a separate external memory/storage medium/disk.

The foregoing technical features of the present specification are applicable to various applications or business models. For example, the foregoing technical features may be applied for wireless communication of a device supporting artificial intelligence (AI).

Artificial intelligence refers to a field of study on artificial intelligence or methodologies for creating artificial intelligence, and machine learning refers to a field of study on methodologies for defining and solving various issues in the area of artificial intelligence. Machine learning is also defined as an algorithm for improving the performance of an operation through steady experiences of the operation.

An artificial neural network (ANN) is a model used in machine learning and may refer to an overall problem-solving model that includes artificial neurons (nodes) forming a network by combining synapses. The artificial neural network may be defined by a pattern of connection between neurons of different layers, a learning process of updating a model parameter, and an activation function generating an output value.

The artificial neural network may include an input layer, an output layer, and optionally one or more hidden layers. Each layer includes one or more neurons, and the artificial neural network may include synapses that connect neurons. In the artificial neural network, each neuron may output a function value of an activation function of input signals input through a synapse, weights, and deviations.

A model parameter refers to a parameter determined through learning and includes a weight of synapse connection and a deviation of a neuron. A hyper-parameter refers to a parameter to be set before learning in a machine learning algorithm and includes a learning rate, the number of iterations, a mini-batch size, and an initialization function.

Learning an artificial neural network may be intended to determine a model parameter for minimizing a loss function. The loss function may be used as an index for determining an optimal model parameter in a process of learning the artificial neural network.

Machine learning may be classified into supervised learning, unsupervised learning, and reinforcement learning.

Supervised learning refers to a method of training an artificial neural network with a label given for training data, wherein the label may indicate a correct answer (or result value) that the artificial neural network needs to infer when the training data is input to the artificial neural network. Unsupervised learning may refer to a method of training an artificial neural network without a label given for training data. Reinforcement learning may refer to a training method for training an agent defined in an environment to choose an action or a sequence of actions to maximize a cumulative reward in each state.

Machine learning implemented with a deep neural network (DNN) including a plurality of hidden layers among artificial neural networks is referred to as deep learning, and deep learning is part of machine learning. Hereinafter, machine learning is construed as including deep learning.

The foregoing technical features may be applied to wireless communication of a robot.

Robots may refer to machinery that automatically process or operate a given task with own ability thereof. In particular, a robot having a function of recognizing an environment and autonomously making a judgment to perform an operation may be referred to as an intelligent robot.

Robots may be classified into industrial, medical, household, military robots and the like according uses or fields. A robot may include an actuator or a driver including a motor to perform various physical operations, such as moving a robot joint. In addition, a movable robot may include a wheel, a brake, a propeller, and the like in a driver to run on the ground or fly in the air through the driver.

The foregoing technical features may be applied to a device supporting extended reality.

Extended reality collectively refers to virtual reality (VR), augmented reality (AR), and mixed reality (MR). VR technology is a computer graphic technology of providing a real-world object and background only in a CG image, AR technology is a computer graphic technology of providing a virtual CG image on a real object image, and MR technology is a computer graphic technology of providing virtual objects mixed and combined with the real world.

MR technology is similar to AR technology in that a real object and a virtual object are displayed together. However, a virtual object is used as a supplement to a real object in AR technology, whereas a virtual object and a real object are used as equal statuses in MR technology.

XR technology may be applied to a head-mount display (HMD), a head-up display (HUD), a mobile phone, a tablet PC, a laptop computer, a desktop computer, a TV, digital signage, and the like. A device to which XR technology is applied may be referred to as an XR device.

The claims recited in the present specification may be combined in a variety of ways. For example, the technical features of the method claims of the present specification may be combined to be implemented as a device, and the technical features of the device claims of the present specification may be combined to be implemented by a method. In addition, the technical characteristics of the method claim of the present specification and the technical characteristics of the device claim may be combined to be implemented as a device, and the technical characteristics of the method claim of the present specification and the technical characteristics of the device claim may be combined to be implemented by a method.

What is claimed is:

1. A method in a wireless communication system supporting Bluetooth communication, the method comprising:
    performing, by an In Flight Entertainment (IFE) device, a scan for a first Bluetooth low energy (BLE) device and a first Bluetooth basic rate/enhanced data rate (BR/EDR) device,
    wherein the scan for the first BLE device and the first Bluetooth BR/EDR device is performed in a time division (TD) method performed in different time intervals,
    wherein the scan for the first BLE device includes a step of receiving a first advertisement signal of the first BLE device,
    wherein the scan for the first Bluetooth BR/EDR device includes a step of transmitting, by the IFE device, a scan signal; and receiving, by the IFE device, a first scan response signal from the first Bluetooth BR/EDR device;
    receiving, by the IFE device, a second advertisement signal from a second BLE device;
    sorting, by the IFE device, a list of the first and second BLE devices based on received signal strength indication (RSSI) values of the first and second advertisement signals; and
    performing, by the IFE device, a connection with the first BLE device or the first Bluetooth BR/EDR device.

2. The method of claim 1, wherein the method further comprising:

determining, by the IFE device, whether to perform the connection with the first BLE device or the first Bluetooth BR/EDR device based on a preset whitelist.

3. An In Flight Entertainment (IFE) device used in a wireless communication system supporting Bluetooth communication, the IFE device comprising:
- a transceiver for transmitting and receiving radio signals; and
- a processor connected to the transceiver, wherein the processor is configured to:
- perform a scan for a first Bluetooth low energy (BLE) device and a first Bluetooth basic rate/enhanced data rate (BR/EDR) device,
- wherein the scan for the first BLE device and the first Bluetooth BR/EDR device is performed in a time division (TD) method performed in different time intervals,
- wherein the scan for the first BLE device includes a step of receiving a first advertisement signal of the first BLE device,
- wherein the scan for the first Bluetooth BR/EDR device includes a step of transmitting, by the IFE device, a scan signal; and receiving, by the IFE device, a first scan response signal from the first Bluetooth BR/EDR device;
- receive a second advertisement signal from a second BLE device;
- sort a list of the first and second BLE devices based on received signal strength indication (RSSI) values of the first and second advertisement signals; and
- perform a connection with the first BLE device or the first Bluetooth BR/EDR device.

4. The IFE device of claim 3, wherein the processor is further configured to:
- determine whether to perform the connection with the first BLE device or the first Bluetooth BR/EDR device based on a preset whitelist.

* * * * *